(12) United States Patent
Myers et al.

(10) Patent No.: US 9,712,887 B2
(45) Date of Patent: Jul. 18, 2017

(54) METHODS AND SYSTEMS FOR REAL-TIME TRANSMUXING OF STREAMING MEDIA CONTENT

(75) Inventors: Robert Linwood Myers, Mississauga (CA); Parasuram Ranganathan, Brampton (CA); Ivan Chvets, Toronto (CA); Krzysztof Pakulski, Mississauga (CA)

(73) Assignee: ARRIS Canada, Inc., Mississauga, Ontario (CA)

( * ) Notice: Subject to any disclaimer, the term of this patent is extended or adjusted under 35 U.S.C. 154(b) by 677 days.

(21) Appl. No.: 13/445,361

(22) Filed: Apr. 12, 2012

(65) Prior Publication Data

US 2013/0275557 A1    Oct. 17, 2013

(51) Int. Cl.
| | |
|---|---|
| *G06F 15/16* | (2006.01) |
| *H04N 21/643* | (2011.01) |
| *H04L 29/06* | (2006.01) |
| *H04N 21/222* | (2011.01) |
| *H04N 21/236* | (2011.01) |
| *H04N 21/2381* | (2011.01) |
| *H04N 21/647* | (2011.01) |

(Continued)

(52) U.S. Cl.
CPC ... *H04N 21/64322* (2013.01); *H04L 65/4084* (2013.01); *H04L 65/605* (2013.01); *H04L 65/80* (2013.01); *H04N 21/2221* (2013.01); *H04N 21/2381* (2013.01); *H04N 21/23608* (2013.01); *H04N 21/64707* (2013.01); *H04N 21/8456* (2013.01); *H04N 21/85406* (2013.01)

(58) Field of Classification Search
CPC .......... H04N 21/2343; H04N 21/6587; H04N 21/2662; H04N 5/783
USPC .......... 709/205, 206, 207, 219, 203
See application file for complete search history.

(56) References Cited

U.S. PATENT DOCUMENTS

| | | |
|---|---|---|
| 5,920,865 A | 7/1999 | Ariga |
| 5,978,843 A | 11/1999 | Wu et al. |
| 6,240,243 B1 | 5/2001 | Chen et al. |

(Continued)

FOREIGN PATENT DOCUMENTS

| | | |
|---|---|---|
| EP | 1122654 A2 | 8/2001 |
| EP | 2410745 A1 | 1/2012 |

OTHER PUBLICATIONS

Notice of Allowance dated Aug. 7, 2012, U.S. Appl. No. 13/445,285.

(Continued)

*Primary Examiner* — Kevin Bates
*Assistant Examiner* — Clarence McCray
(74) *Attorney, Agent, or Firm* — Stewart M. Wiener

(57) ABSTRACT

Systems and methods for providing a full reverse translating proxy for streaming media content, which can employ session tracking or transmuxing, or both. The described system can be integrated seamlessly into an existing adaptive streaming environment. The system can transmux each request from a client into a delivery format supported by an origin content server, and vice versa, irrespective of the specific delivery format used by either the client or server. Conversely, the system can further transmux the requested content into the delivery format used by the client. A stateful session model can link each request from a specific end user for a specific piece of content to a particular identified client streaming session.

24 Claims, 15 Drawing Sheets

(51) Int. Cl.
*H04N 21/845* (2011.01)
*H04N 21/854* (2011.01)

(56) References Cited

U.S. PATENT DOCUMENTS

| | | | |
|---|---|---|---|
| 6,279,040 B1 | 8/2001 | Ma et al. | |
| 6,529,996 B1 | 3/2003 | Nguyen et al. | |
| 6,621,979 B1* | 9/2003 | Eerenberg et al. | 386/346 |
| 7,028,096 B1 | 4/2006 | Lee | |
| 7,143,170 B2 | 11/2006 | Swildens et al. | |
| 7,194,000 B2 | 3/2007 | Balachandran et al. | |
| 7,359,985 B2 | 4/2008 | Grove et al. | |
| 7,369,610 B2 | 5/2008 | Xu et al. | |
| 7,376,716 B2 | 5/2008 | Dilley et al. | |
| 7,392,325 B2 | 6/2008 | Grove et al. | |
| 7,446,774 B1 | 11/2008 | MacInnis et al. | |
| 7,536,469 B2 | 5/2009 | Chou et al. | |
| 7,536,470 B2 | 5/2009 | Li et al. | |
| 7,543,073 B2 | 6/2009 | Chou et al. | |
| 7,734,730 B2 | 6/2010 | McCanne | |
| 7,930,449 B2 | 4/2011 | Tinsman et al. | |
| 7,991,049 B2 | 8/2011 | MacInnis et al. | |
| 8,065,426 B2 | 11/2011 | Edelman et al. | |
| 8,155,020 B2* | 4/2012 | Giaretta et al. | 370/252 |
| 8,161,021 B2 | 4/2012 | Hirabayashi et al. | |
| 8,184,142 B2 | 5/2012 | Harel et al. | |
| 8,190,677 B2 | 5/2012 | Myers et al. | |
| 8,209,730 B2* | 6/2012 | Hardacker et al. | 725/90 |
| 8,228,363 B2 | 7/2012 | Halavy | |
| 8,301,696 B2 | 10/2012 | Myers et al. | |
| 8,521,899 B2* | 8/2013 | Narula | H04L 65/4092 709/231 |
| 8,621,025 B2* | 12/2013 | Ridgard | H04L 67/1095 709/206 |
| 8,649,668 B2* | 2/2014 | Moorer | 386/343 |
| 9,003,043 B1* | 4/2015 | Moranta | H04L 67/1097 709/227 |
| 9,038,116 B1* | 5/2015 | Knox | H04L 12/2805 709/219 |
| 2002/0140851 A1 | 10/2002 | Laksono | |
| 2003/0110234 A1* | 6/2003 | Egli | G06T 3/4092 709/217 |
| 2003/0195977 A1 | 10/2003 | Liu et al. | |
| 2003/0231863 A1* | 12/2003 | Eerenberg et al. | 386/68 |
| 2004/0013112 A1* | 1/2004 | Goldberg | H04L 63/0254 370/389 |
| 2004/0025186 A1* | 2/2004 | Jennings | H04L 12/5695 725/93 |
| 2004/0202320 A1 | 10/2004 | Amini et al. | |
| 2004/0267908 A1* | 12/2004 | Doi | H04N 21/222 709/219 |
| 2005/0163224 A1 | 7/2005 | Shin et al. | |
| 2005/0289619 A1* | 12/2005 | Melby | 725/95 |
| 2006/0143678 A1 | 6/2006 | Chou et al. | |
| 2006/0165166 A1 | 7/2006 | Chou et al. | |
| 2006/0227754 A1* | 10/2006 | Ko | H04W 24/08 370/338 |
| 2006/0248216 A1 | 11/2006 | Park | |
| 2007/0022215 A1 | 1/2007 | Singer et al. | |
| 2007/0066286 A1* | 3/2007 | Hurtta | 455/414.1 |
| 2007/0118618 A1 | 5/2007 | Kisel et al. | |
| 2007/0121723 A1 | 5/2007 | Mathew et al. | |
| 2007/0165524 A1 | 7/2007 | Mascolo | |
| 2007/0201549 A1 | 8/2007 | Hannuksela et al. | |
| 2007/0263087 A1 | 11/2007 | Hong et al. | |
| 2007/0268362 A1 | 11/2007 | West et al. | |
| 2007/0276954 A1 | 11/2007 | Chan et al. | |
| 2007/0291837 A1 | 12/2007 | Eleftheriadis | |
| 2008/0095230 A1 | 4/2008 | Hannuksela et al. | |
| 2008/0120424 A1 | 5/2008 | Deshpande | |
| 2008/0130658 A1 | 6/2008 | Chakareski et al. | |
| 2008/0211901 A1 | 9/2008 | Civanlar et al. | |
| 2008/0239062 A1 | 10/2008 | Civanlar et al. | |
| 2008/0247460 A1 | 10/2008 | Kang et al. | |
| 2009/0013083 A9 | 1/2009 | Garcia-Luna-Aceves et al. | |
| 2009/0016434 A1 | 1/2009 | Amonou et al. | |
| 2009/0031021 A1 | 1/2009 | Bae et al. | |
| 2009/0119594 A1 | 5/2009 | Hannuksela | |
| 2009/0178091 A1 | 7/2009 | Miyamoto et al. | |
| 2009/0295988 A1 | 12/2009 | Kohno | |
| 2010/0054374 A1* | 3/2010 | Larsson | H04L 1/0631 375/341 |
| 2010/0085918 A1* | 4/2010 | Dantuluri | H04W 4/001 370/328 |
| 2010/0094950 A1* | 4/2010 | Zuckerman et al. | 709/213 |
| 2010/0094962 A1* | 4/2010 | Zuckerman et al. | 709/219 |
| 2010/0094965 A1* | 4/2010 | Zuckerman et al. | 709/219 |
| 2010/0161795 A1* | 6/2010 | Deridder | H04L 67/22 709/224 |
| 2010/0228862 A1 | 9/2010 | Myers | |
| 2010/0228875 A1 | 9/2010 | Myers | |
| 2010/0266042 A1 | 10/2010 | Koo et al. | |
| 2010/0316136 A1 | 12/2010 | Jeon et al. | |
| 2010/0316360 A1 | 12/2010 | Jeon et al. | |
| 2010/0316361 A1 | 12/2010 | Jeon et al. | |
| 2010/0316362 A1 | 12/2010 | Jeon et al. | |
| 2011/0082945 A1 | 4/2011 | Myers et al. | |
| 2011/0296048 A1* | 12/2011 | Knox | H04L 65/605 709/231 |
| 2012/0011267 A1* | 1/2012 | Ma | H04N 21/44209 709/231 |
| 2012/0042050 A1* | 2/2012 | Chen | H04L 65/607 709/219 |
| 2012/0084356 A1* | 4/2012 | Ferdi | H04L 65/1093 709/204 |
| 2012/0254456 A1* | 10/2012 | Visharam | H04N 21/2343 709/231 |
| 2012/0259942 A1* | 10/2012 | Brookins | H04L 67/28 709/213 |
| 2012/0265853 A1* | 10/2012 | Knox | H04N 21/2187 709/218 |
| 2013/0007814 A1* | 1/2013 | Cherian | H04L 65/605 725/62 |
| 2013/0132462 A1* | 5/2013 | Moorer | 709/203 |
| 2013/0339541 A1* | 12/2013 | Narula | H04L 65/4092 709/231 |
| 2014/0219100 A1* | 8/2014 | Pandey | H04W 28/08 370/236 |
| 2014/0259044 A1* | 9/2014 | Kirby | G06Q 30/0207 725/23 |

OTHER PUBLICATIONS

United States Office Action, U.S. Appl. No. 12/400,306, dated Jan. 3, 2012.
United States Office Action, U.S. Appl. No. 12/400,306, dated Jul. 19, 2011.
United States Office Action, U.S. Appl. No. 12/400,306, dated Feb. 3, 2011.
United States Office Action, U.S. Appl. No. 12/400,270, dated Nov. 23, 2010.
United States Office Action, U.S. Appl. No. 12/400,306, dated Jul. 18, 2012.
United States Office Action Response, U.S. Appl. No. 12/842,474 dated Jul. 9, 2012.
United States Office Action, U.S. Appl. No. 12/400,270, dated Apr. 28, 2011.
United States Office Action Response and RCE, U.S. Appl. No. 12/400,306, dated Oct. 17, 2011.
United States Office Action Response and RCE, U.S. Appl. No. 12/400,270, dated Jul. 8, 2011.
United States Office Action Response, U.S. Appl. No. 12/400,306, dated May 3, 2011.
United States Office Action Response, U.S. Appl. No. 12/400,270, dated Feb. 17, 2011.
United States Office Action Response, U.S. Appl. No. 12/400,306, dated Apr. 2, 2012.
United States Office Action, U.S. Appl. No. 12/842,474, dated Jun. 19, 2012.

(56) References Cited

OTHER PUBLICATIONS

U.S. Notice of Allowance, U.S. Appl. No. 12/842,515, dated Mar. 5, 2012.
Co-pending U.S. Appl. No. 12/842,515, "Methods and Systems for Scalable Video Delivery", filed Jul. 23, 2010.
Co-pending U.S. Appl. No. 12/842,474, "Methods and Systems for Scalable Video Chunking", filed Jul. 23, 2010.
Co-pending U.S. Appl. No. 12/400,306, "Progressive Download Gateway", filed Mar. 9, 2009.
Extended European Search Report, Application No. 11174626.9-1247, dated Nov. 9, 2011.
Alex Zambelli: "IIS Smooth Streaming Technical Overview", Mar. 31, 2009, XP55009366, Retrieved from the Internet: URL: http://img.prodek.lt/documents/IIS_Smooth_Streaming_Technical_Overview; pdf [retrieved on Oct. 12, 2011] the whole document.
Thomas Schierl et al. "Response to CfP on HTTP Streaming of MPEG Media—On Adaptive HTTP Streaming using SVC and MVC", 93. MPEG Meeting; Jul. 26, 2010-Jul. 30, 2010; Geneva; (Motion Picture Expert Group or ISO/IEC JTC1/SC29/WG11) No. M17851, Jul. 22, 2010.
Universal Mobile Telecommunications System (UMTS); LTD; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F06921 Sophia-Antipolis; France, vol. 3GPP SA 4, No. V9.3.0 Jun. 1, 2010, XP014047290, section 12.1, section 12.6.2, p. 109, examples 15 and 16.
Anonymous: "Study of ISO/IEC: 2009/DCOR 1", 90. MPEG Meeting; Oct. 26, 2009-Oct. 30, 2009; Xian; (Motion Picture Expert Group or ISO/IEC JTC1/SC29/WG11) No. N10898, Nov. 18, 2009 XP030017397.
Wenger M M Hannuksela T Stockhammer M Westerlund D Singer S: "RTP Payload Format for H.264 Video; rfc3984.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11AND ITU-T SG. 16); URL: HTTP://WFTP3.ITU.INT/AV-ARCH/JC TVC-Site/, Internet Engineering Task Force, IETF, CH, Feb. 1, 2005, XP015009755, ISSN: 0000-0003, section 5.5.
Microsoft Corporation: "IIS Smooth Streaming Transport Protocol", Internet Citation, Sep. 8, 2009, pp. 1-55, XP002617721, Retrieved from the Internet: URL: http://www.iis.net/community/files/media/smoothspecs/%5BMS-SMTH%5D.pdf [retrieved on Jan. 21, 2011] section 1.3, section 4.
ISO/IEC 14496-15:2004 Amd 2:2008, "Information technology—Coding of audio-visual objects—Part 15: Advanced Video Coding (AVC) file format".
Jens-Rainer Ohm, "Scalable Video Coding", In: Shenzhen Workshop, RWTH Aachen University, Oct. 2007, Aachen, Germany.
ISO/IEC 14496-12: Third Edition Oct. 15, 2008, "Information technology—Coding of audio-visual objects—Part 12: ISO base media file format".
Heiko Schwarz et al., "Overview of the Scalable Video Coding Extension of the H.264/AVC Standard", IEEE Transactions on Circuits and Systems for Video Technology, Sep. 2007, vol. 17, No. 9, Berlin, Germany.
Hypertext Transfer Protocol—HTTP/1.1, section 10.3, Internet RFC 2616, Retrieved from the internet: URL: <http://www.w3.org/Protocols/rfc2616.html>[retrieved on Apr. 1, 2012].
"Use Standard Redirects—Don't Break Button!", W3C, Retrieved from the Internet: URL: <http://www.w3.org/QA/Tips/reback>[retrieved on Apr. 1, 2012].
Co-pending U.S. Appl. No. 12/400,270, "Multi-Tiered Scalable Media Streaming Systems and Methods", filed Mar. 9, 2009.
Previously co-pending U.S. Appl. No. 13/445,285, "Methods and Systems for Scalable Video Delivery", issued as U.S. Pat. No. 8,301,696 on Oct. 30, 2012.
Office Action Response dated Jul. 18, 2012, U.S. Appl No. 13/445,285.
Office Action dated Jun. 5, 2012, U.S. Appl. No. 13/445,285.
Response to Extended European Search Report, Application No. 11174626.9-1247, dated Jul. 20, 2012.
Response and RCE dated Oct. 17, 2012, U.S. Appl. No. 12/400,306.
Office Action dated Nov. 2, 2012, U.S. Appl. No. 12/842,474.
European Communication, Application No. 11174626.9-1247, dated Oct. 16, 2012.
Extended European Search Report, RE: Application No. 13775991.6, dated Nov. 24, 2015.
C. Knowlton, "Adaptive Streaming Comparison: The Official Microsoft IIS Site", retrieved from the Internet at URL <http://www.iis.net/learn/media/smooth-streaming/adaptive-streaming-comparison>, on Apr. 28, 2014.
E. Andriescu, et al., "AmbiStream: A Middleware for Multimedia Streaming on Heterogeneous Mobile Devices", Springer Berlin Heidelberg, Dec. 12, 2011, pp. 240-259.
Official Action, RE: Japanese Application No. 2015-504825 (foreign text and English translation), dated Nov. 4, 2015.
Official Action, RE: Canadian Application No. 2,870,059, dated Nov. 17, 2015.
Official Action, RE: Mexican Application No. MX/a/2014/012361, dated Oct. 28, 2016.
Official Action, RE: Canadian Application No. 2,870,059, dated Nov. 25, 2016.
EPC Examination Report, RE: Application No. 13775991.6, dated Jul. 15, 2016.

\* cited by examiner

METHODS AND SYSTEMS FOR REAL-TIME TRANSMUXING OF STREAMING MEDIA CONTENT

FIELD

The described embodiments relate to the field of streaming media, and in particular to real-time or on-demand streaming of video and audio content.

INTRODUCTION

The market for "Over The Top" (OTT) multimedia services is becoming increasingly complex. Many content producers are embracing the so-called three-screen approach for OTT video content (e.g., television, Internet, mobile device, etc.). Device manufacturers are integrating streaming capabilities directly into the respective products. Traditional industry players are fighting to win or retain marketshare, while new entrants are emerging.

New standards are emerging for these various services. However, one generally accepted commonality is the use of HTTP-based Adaptive Streaming. HTTP—or Hypertext Transfer Protocol—is a widely used standard on the WorldWide Web. Its prevalence makes it suitable for use on a variety of devices and, in particular, in a variety of network environments. Accordingly, HTTP-based Adaptive Streaming, which leverages HTTP, is seen as a suitable way to ensure acceptable quality of experience (QoE) for end-users, while delivering the ability to view the same content on any device on any network.

A number of the current HTTP-based Adaptive Streaming solutions for multimedia (e.g., video and audio) content provide for good QoE even when devices are in an environment with dynamically varying bandwidth. In particular, many adaptive streaming solutions now generally use multiple, or alternatively scalable, encodings of the same content, which can be delivered according to the current bandwidth environment.

However, each of the disparate streaming solutions generally uses a different approach to content formatting, client retrieval and playback protocols, and the associated algorithms to select bitrates. Although there may be commonalities, such as in the underlying content encoding format, these approaches may not be immediately compatible. Moreover, the network architecture (e.g., servers, devices, software) used to deliver the streaming content can differ.

Given the existence of multiple competing standards, content producers are faced with the problem of selecting one or more mutually incompatible standards to use and support. For example, devices such as the Apple iPhone, iPod and iPad only support the Apple streaming solution. However, the Apple solution is not directly supported by Microsoft Windows-based devices. Conversely, the Microsoft Smooth Streaming approach is not directly supported on Apple devices. This dilemma is only further exacerbated when the content producer wishes to support other devices, such as those based on the Google Android operating system.

Various organizations are developing standards for HTTP-based adaptive streaming, but each of these may ultimately have their own particular idiosyncrasies depending on their target application. For example, MPEG is developing DASH (Dynamic Adaptive Streaming over HTTP), 3GPP has defined their own approach, W3C is developing Media Fragments.

Given this environment, content producers must either support all the various permutations of standards and devices, or risk leaving some combinations unsupported.

SUMMARY

In a first broad aspect, there is provided a system for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising: a mapping module configured to receive a client request from the client for at least a requested portion of the streaming media content item using a client delivery format, determine that the client request is in the client delivery format and generate an intermediate request in the origin delivery format that corresponds to the client request; an intermediate client module configured to transmit the intermediate request to the server and receive a subset of the first plurality of content fragments corresponding to the requested portion of the streaming media content item, wherein the subset is received in the origin container format from the origin server using the origin delivery format; a container conversion module configured to unpack the subset from the origin container format and pack the subset into a client container format, wherein the content fragments in the subset that are packed in the client container format remain encoded in the origin encoding format; and an intermediate server module configured to transmit the streaming media content item in the client container format to the client using the client delivery format.

In some cases, the container conversion module packs the streaming media content items into the client container format by reassembling the first plurality of content fragments into a second plurality of content fragments, wherein the second plurality of content fragments have different durations than the first plurality of content fragments.

In some cases, the mapping module may determine that the origin server is configured to transmit using the origin delivery format by transmitting one or more requests using predetermined delivery formats and determining whether a successful response is received. The mapping module may determine that the client request is in the client delivery format by comparing the client request with a plurality of predetermined request patterns.

The intermediate server may further comprise a session management module configured to initiate a streaming session when the client request is received.

The session management module may be further configured to determine a session state of the client for the streaming session by monitoring fragment requests from the client.

In another broad aspect, there is provided a method for delivering a streaming media content item from an origin server to a client, wherein the origin server has an origin container format and an origin delivery format for the streaming media content, and wherein the streaming media content comprises a first plurality of content fragments encoded in an origin encoding format, the method comprising: receiving a client request from the client for at least a requested portion of the streaming media content item using a client delivery format; determining that the client request is in the client delivery format; generating an intermediate request corresponding to the client request, wherein the origin request is in the origin delivery format; transmitting the intermediate request to the server; receiving a subset of the first plurality of content fragments corresponding to the requested portion of the streaming media content item, wherein the subset is received in the origin container format from the origin server using the origin delivery format; unpacking the subset from the origin container format and packing the subset into a client container format, wherein the content fragments in the subset that are packed in the client container format remain encoded in the origin encoding format; and transmitting the streaming media content item in the client container format to the client using the client delivery format.

The packing may be performed by reassembling the first plurality of content fragments into a second plurality of content fragments, wherein the second plurality of content fragments have different durations than the first plurality of content fragments.

The method may further comprise determining that the origin server is configured to transmit using the origin delivery format by transmitting one or more requests using predetermined delivery formats and determining whether a successful response is received.

The method also may further comprise determining that the client request is in the client delivery format by comparing the client request with a plurality of predetermined request patterns.

The method also may further comprise initiating a streaming session when the client request is received.

The method also may further comprise determining a session state of the client for the streaming session by monitoring fragment requests from the client.

In another broad aspect, there is provided a system for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising: a mapping module configured to receive at least one client request from the client for at least a requested portion of the streaming media content item and generate an intermediate request that corresponds to the at least one client request; a session management module configured to initiate a streaming session when the at least one client request is received, the session management module further configured to determine a session state of the client for the streaming session by monitoring the at least one client request; an intermediate client module configured to transmit the intermediate request to the server and receive a subset of the first plurality of content fragments corresponding to the requested portion of the streaming media content item; an intermediate server module configured to transmit the streaming media content item to the client.

The origin server may have an origin container format and an origin delivery format for the streaming media content, wherein the mapping module may be configured to receive the client request using a client delivery format and determine that the client request is in the client delivery format, wherein the intermediate request may be in the origin delivery format, wherein the subset of the first plurality of content fragments may be received in the origin container format from the origin server using the origin delivery format, and the system may further comprise a container conversion module configured to unpack the subset from the origin container format and pack the subset into a client container format, wherein the content fragments in the subset that are packed in the client container format may remain encoded in the origin encoding format, wherein the intermediate server module may be configured to transmit the streaming media content item in the client container format to the client using the client delivery format.

The session management module may be further configured to identify the state of all open client sessions. The session management module may be further configured to mark the session state as inactive after a predetermined timeout period. The session management module may be further configured mark the session state as active when a further fragment request associated with the client session is received.

The at least one client request may comprise a plurality of client requests, and wherein the session state may be determined based on a timing of the plurality of client requests.

When the timing may indicate that the plurality of client requests are for fragments that are out of sequence, then a seek operation may be determined. When the timing may indicate that an actual elapsed time exceeds a playing time of fragments requested in the plurality of client requests, then a trick play operation may be determined.

In another broad aspect, there is provided a method for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising: receiving at least one client request from the client for at least a requested portion of the streaming media content item; generating an intermediate request that corresponds to the at least one client request; initiating a streaming session when the at least one client request is received; determining a session state of the client for the streaming session by monitoring the at least one client request; transmitting the intermediate request to the server; receiving a subset of the first plurality of content fragments corresponding to the requested portion of the streaming media content item; and transmitting the streaming media content item to the client.

The origin server may have an origin container format and an origin delivery format for the streaming media content, wherein the client request may be received using a client delivery format, wherein the intermediate request may be in the origin delivery format, wherein the subset of the first plurality of content fragments may be received in the origin container format from the origin server using the origin delivery format, the method may further comprise unpacking the subset from the origin container format and packing the subset into a client container format, wherein the content fragments in the subset that are packed in the client container format may remain encoded in the origin encoding format, and wherein the streaming media content item may be transmitted in the client container format to the client using the client delivery format.

The method may further comprise identifying the state of all open client sessions. The method may further comprise marking the session state as inactive after a predetermined timeout period. The method may further comprise marking the session state as active when a further fragment request associated with the client session is received.

The at least one client request may comprise a plurality of client requests, and wherein the session state may be determined based on a timing of the plurality of client requests.

When the timing indicates that the plurality of client requests are for fragments that are out of sequence, then a seek operation may be determined. When the timing indicates that an actual elapsed time exceeds a playing time of fragments requested in the plurality of client requests, then a trick play operation may be determined.

Further aspects and advantages of the embodiments described herein will appear from the following description taken together with the accompanying drawings.

DRAWINGS

For a better understanding of embodiments of the systems and methods described herein, and to show more clearly how they may be carried into effect, reference will be made, by way of example, to the accompanying drawings in which.

Figure 1:
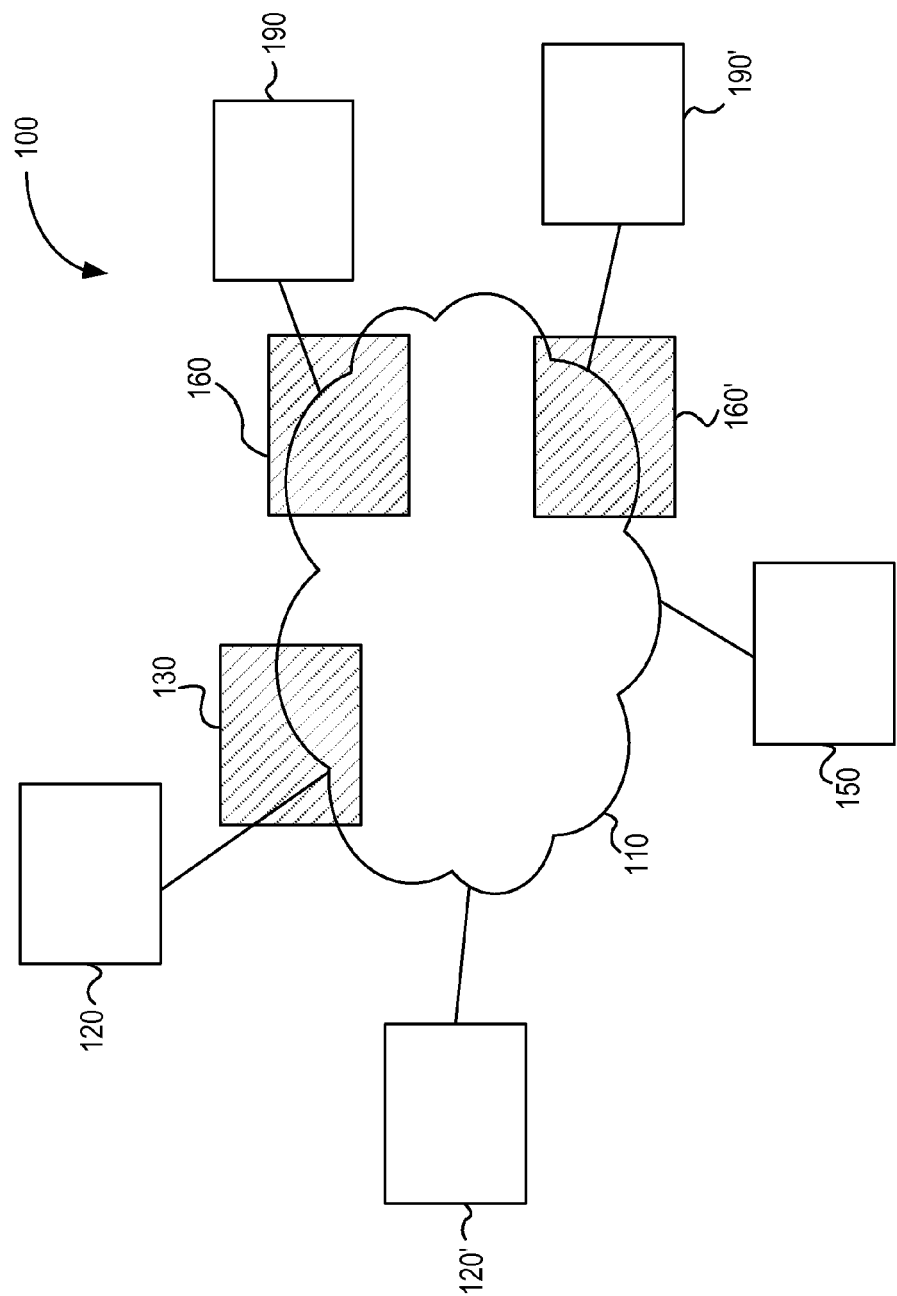
FIG. 1 illustrates an exemplary network capable of transmitting and receiving media content.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the methods, systems and devices described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be network servers. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or optical disc) readable by a general or special purpose programmable computer, for configuring and operating the computer when the storage media or device is read by the computer to perform the procedures described herein. The inventive system may also be considered to be implemented as a non-transitory computer-readable storage medium, configured with a computer program, where the storage medium so configured causes a computer to operate in a specific and predefined manner to perform the functions described herein.

Furthermore, the methods, systems and devices of the described embodiments are capable of being distributed in a computer program product comprising a physical, non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

There are, at present, a variety of disparate standards for HTTP-based adaptive streaming. Table 1 sets out the various properties of five example standards.

TABLE 1

|  | Microsoft | Apple | Adobe Zeri |
|---|---|---|---|
| Transport Protocol | HTTP | HTTP | HTTP |
| TCP Connections | 2-3 | 1 | 2 |
| Default Fragment Size | 2 | 10 | Variable |
| Origin Files | # Profiles + Manifest | # Profiles × 720/hr + # Profiles + 1 | # Profiles + Manifest |
| Codec | H.264 AVC | H.264 AVC | H.264 AVC |
| Wire Format | MP4 Fragments | M2TS Fragments | MP4 Fragments |
| File Format | .ismv | .ts | .f4f; .f4m |
| Byte Range Support | No | No | Yes |
| Std. Origin | No | Yes | No |
| DRM | Windows DRM; Playready | AES-128 | Adobe Access |
| Manifest | .ism/.ismc | .m3u8 with ext. | .fmf |
| Client | Silverlight | Quicktime; iOS | Adobe Flash 10.1 |

As shown in Table 1, each of these standards uses HTTP as its Transport Protocol, and each may use the MPEG-4

AVC (i.e., H.264) standard as the video codec (i.e., encoding format). However, beyond these commonalities, the illustrated standards diverge significantly in terms of file formatting and delivery schemes (i.e., delivery formats). It will be appreciated that the described embodiments can be used with other transport protocols and video codecs.

From the content producer perspective, delivering the same content to multiple players introduces progressively greater complexity as more devices and standards are supported. Fortunately, as each of the standards can support the same encoding format of H.264 (MPEG-4 AVC), a Content Producer need only encode content once for each of the bit rates that is to be supported. However, content files may need to be recreated and stored multiple times to support the different container formats. In particular, when content files are created, the encoded video and audio content is generally "muxed" into the appropriate format for a specific player or standard.

In addition, content in each of the disparate formats may need to be delivered by specific servers that understand the respective delivery formats.

TABLE 2

Storage and File Impact of Multi-Adaptive Streaming Solutions

| Bitrate (kbps) | 300 | 600 | 900 | 1200 | 1500 | 2000 | 2500 | 3000 | Total |
| --- | --- | --- | --- | --- | --- | --- | --- | --- | --- |
| MS Storage (MB) | 22.5 | 45 | 67.5 | 90 | 112.5 | 150 | 187.5 | 225 | 900 |
| MS # of Files | 1 | 1 | 1 | 1 | 1 | 1 | 1 | 1 | 10 |
| Apple Storage (MB) | 22.5 | 45 | 67.5 | 90 | 112.5 | 150 | 187.5 | 225 | 900 |
| Apple # of Files | 60 | 60 | 60 | 60 | 60 | 60 | 60 | 60 | 480 |
| Adobe Storage (MB) | 22.5 | 45 | 67.5 | 90 | 112.5 | 150 | 187.5 | 225 | 900 |
| Adobe # of Files | 1 | 1 | 1 | 1 | 1 | 1 | 1 | 1 | 10 |

Referring now to Table 2, there is shown the storage impact of supporting three major delivery formats for an example 10-minute video. Although each of the delivery formats may have a small difference in overhead, it was assumed to be the same in this example for the sake of simplicity.

It can be seen in Table 2 that, even though the encoding format may be identical among all three solutions, the use of different delivery formats—and the difference in container formats this may entail—for each of the supported standards effectively triples the required storage space. For example, the Apple fragments are only 10 seconds in duration and thus there is a larger number of files. Accordingly, each additional supported delivery format may represent a concomitant increase in required storage space. This may also result in increased bandwidth costs to deliver content between origin servers and caching servers located at the edges of content delivery networks.

The example standards shown above generally use the same fundamental approach of grouping content in temporally aligned media fragments, with an intelligent client that determines which fragments to retrieve in order to playback the content. However, the actual approach and delivery format used to retrieve content differs in each standard.

In the approaches used by the Adobe and Microsoft standards, the model is based on a client that makes a proprietary URL request. The proprietary URL request is received by a server module that interprets the request and retrieves the appropriate data from the appropriate file containing the requested content.

The server module may be a plug-in to an existing HTTP server, such as Microsoft IIS or Apache. Accordingly, if the content producer wishes to deliver content to devices using each of the different delivery formats, the content producer may be required to operate different servers running each of the different plug-ins. Likewise, the content producer may need to support different network infrastructures for each supported standard, along with all the associated costs of managing multiple overlay networks.

In addition to the different server approaches, each of the individual client approaches has been developed with its own particular algorithms for selecting a desired bitrate and when to adjust the bitrate in response to changing network conditions. Each of these clients may be tuned to behave differently in various conditions.

As a result of this, each standard has associated "Best Practices" for content creation that is linked to these client algorithms. For example, Microsoft recommends using fragment durations of 2-5 seconds, while Apple recommends using fragment durations of 10 seconds. Adobe has multiple recommendations for duration depending on the target deployment.

Adding to this complexity is the issue of codec profiles in encoding formats. In particular, certain devices may only support a subset of the profiles defined by the H.264 (MPEG-4 AVC) codec standard. The selection and support of these profiles may be left to the content producer. As a result, the content producer may simply re-encode and mux content for each client device and player type, further compounding the issues of processing, storage and content management.

The concept of transcoding will be understood as the process of re-encoding a media file or stream from one codec to another. A related concept is that of transrating, which can be the process of changing the encoding parameters of a media file or stream, using the same codec, to produce one or more output encoded files or streams at different bitrates (typically lower bitrates than the source content).

Specific transrating techniques have been developed to reduce computational requirements as compared to a full decode and re-encode process. These transrating techniques primarily developed as a way to allow varying the bit rate of a video stream as it is delivered to the client based on network conditions, with the goal of improving the quality of experience. Such techniques may leverage decisions made during the original encoding process (e.g., re-use of motion vector information, etc.). However, some of these techniques may be limiting in that they may only support different quantization parameters in the re-encode process, while not allowing for other more flexible changes, such as a change in spatial resolution. Recent HTTP-based adaptive streaming approaches have diminished the need for pure transrating approaches.

In contrast to transcoding and transrating, there is described herein the process of transmuxing, which comprises changing container formats to meet the need of a specific client or player, while retaining the underlying content in its originally encoded form. The computational requirements to perform transmuxing can be orders of magnitude lower than that required for transrating or transcoding. This is because transmuxing can omit processing the content at the video compression (codec) level.

With HTTP-based adaptive streaming solutions now all generally supporting the H.264 codec, and with the associated low computational requirements, transmuxing can be employed to allow for a single set of content files to be used to support any of the wide variety of generally employed HTTP-based adaptive streaming approaches, without further transcoding or transrating.

In practice, transmuxing may involve a set of services that can take existing content, irrespective of the original delivery format, and dynamically create the appropriate set of files (e.g., manifest and content fragments) to deliver to a specific client using the client's desired delivery format.

In a content delivery network (CDN), transmuxing may be performed "on-the-fly" or "on-demand" wherever the transmuxing module is located. In some cases, the transmuxing module may be located near an origin server (i.e., the original content server). In other cases, the transmuxing module may be elsewhere in a network (e.g., in the cloud). Finally, in some cases, the transmuxing module may be located at or near an edge node of a CDN. There may be additional benefits associated with performing on-the-fly transmuxing at an edge node.

Typically, the stateless nature of a generic web server limits the nature of services that can be provided at an edge node of a CDN. That is, a generic web server may lack the ability to track each request from a particular client and associate it with past or future requests for a particular content item. This lack of ability to track the state of a streaming session limits the ability to provide session-specific services.

Described herein is a stateful session model that can link each request from a specific end user for a specific piece of content to a particular identified client streaming session.

In some embodiments, this stateful session tracking can be provided by creating content manifest files that are specific to each session (e.g., comprising a unique session identifier), such that all future requests for either manifests or fragments can be identified to be part of the same session. The ability to identify and track a session can facilitate additional services and deployment models, such as restricting high bitrates (e.g., higher quality streams) to customers at a different price point, or restricting playback time based on subscription or payment type. This ability can be provided through the use of policies, which may be based on a number of parameters.

Policies can be applied on a per session basis. Per session policies, such as rate limiting, may exploit the ability to assign a maximum total bandwidth for a group of users (e.g., all users for www.example.com). By rate shaping each individual user, the available bandwidth for the group can be distributed fairly among all concurrent users. Policies such as time limits or amount downloaded can also be applied on a per session basis. In addition, users can be grouped based on session contexts such as player type, target URL, network type, etc.

The combination of session tracking and on-the-fly transmuxing enables the creation of manifests and content fragments that can be specific to a particular client device or player, and use the client's preferred delivery format. Accordingly, each session can be unique, offering a different QoE optimized to that particular session.

Described herein is a full reverse translating proxy system that can employ session tracking or transmuxing, or both. The described system can be integrated seamlessly into an existing adaptive streaming environment. In particular, the system does not require that the origin content be in a specific delivery format. The system can transmux or "translate" each request from a client into a delivery format supported by an origin content server, and vice versa, irrespective of the specific delivery format used by either the client or server. For example, if an origin server deployed by a content producer uses the Microsoft Smooth Streaming delivery format, the system can retrieve requested content using native Smooth Streaming protocols, regardless of the delivery format used by the requesting client. Conversely, the system can transmux the requested content into the delivery format used by the client. Thus, content producers can retain and leverage all of their existing investments in encoders, content management systems and origin servers. For a CDN, which may serve many content producers, the described system can be deployed in lieu of multiple parallel edge nodes, which would otherwise be required to report each of the different streaming standards.

Referring now to FIG. 1, there is illustrated an exemplary system 100 for transmitting and receiving streaming media presentations. System 100 comprises a network 110, one or more origin servers 120 and 120', a server-side proxy server 130, an intermediate proxy server 150, one or more edge servers 160 and 160' and one or more client devices 190 and 190'.

Network 110 can be a data network comprised of one or more private and public networks, such as the Internet.

Origin server 120 can be a network server equipped with data storage for storing media content, such as audio and video files in the MPEG-4 AVC format, memory and a processor configured to provide the media content using an HTTP-based adaptive streaming protocol. In one embodiment, origin server 120 can be configured to provide the media content using the Microsoft Smooth Streaming delivery format. In other embodiments, origin server 120 may be configured to provide the media content using another delivery format, such as those developed by Adobe or Apple.

Origin server 120' may be generally analogous to origin server 120, except that it may use a different delivery format for HTTP-based adaptive streaming than origin server 120.

Edge server 160 can be a network server or apparatus equipped with data storage for caching media content, memory and a processor configured to provide a reverse translating proxy and transmuxing service, as described herein. Each edge server 160 can be located generally proximately to one or more client devices 190 and 190', either geographically or in network terms (i.e., within relatively few network hops).

Server-side proxy server 130 and intermediate proxy server 150 may be generally analogous to edge server 160, except that they may be in a different position on the network. For example, server-side proxy server 130 may be positioned near to origin server 120 and intermediate proxy server 150 may be positioned within network 110 (e.g., within the "cloud").

Client devices 190 and 190' can be a network-enabled multimedia playback device, such as a personal computer, tablet computer, smartphone, network-enabled television or media player, or the like. Each client device 190 or 190' generally comprises a memory and processor that can be configured to retrieve media content over a network using a streaming (e.g., HTTP-based adaptive streaming) delivery format and to decode the content for playback to a user.

Client device 190' is generally analogous to client device 190, except that it may be configured to use a different delivery format than client device 190.

For example, in one embodiment, client device 190 can be configured to retrieve the media content using the Microsoft Smooth Streaming delivery format. In other embodiments, client device 190 may be configured to retrieve the media content using another delivery format, such as those developed by Adobe or Apple.

Figure 2:
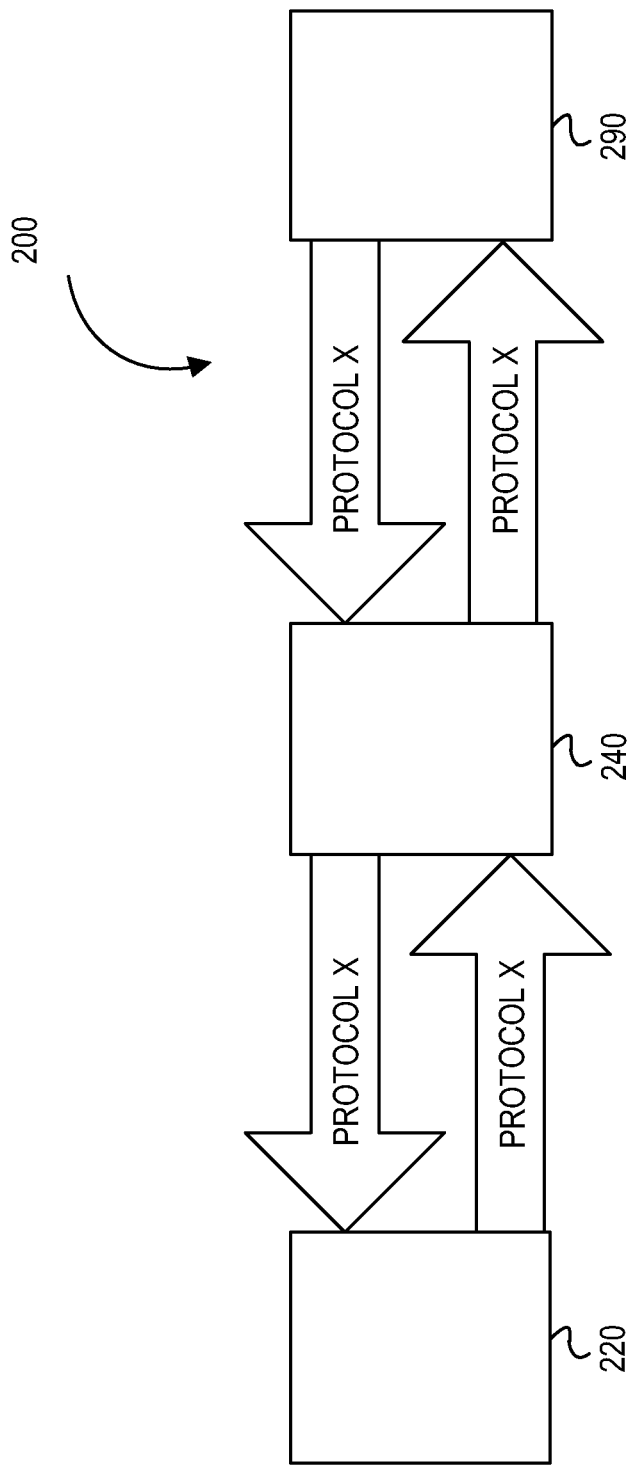
FIG. 2 illustrates a prior art streaming system.

Referring now to FIG. 2, there is illustrated a prior art streaming system 200. Streaming system 200 comprises an origin server 220, a client device 290 and a caching server 240. Origin server 220 may be generally analogous to origin server 120. Similarly, client device 290 may be generally analogous to client device 190 or 190'

Caching server 240 can be a reverse proxy or caching server, comprising data storage, memory and a processor configured to provide reverse proxy service. Generally, a reverse proxy comprises an HTTP server for receiving requests from a client, such as client device 290. The reverse proxy also comprises an HTTP client for transmitting the requests to an upstream server, such as origin server 220. When a request response is received, the reverse proxy can forward the response data to client device 290 and, optionally, cache the response data locally. If, at a later time, the reverse proxy receives another identical request (e.g., for the same content), the reverse proxy can immediately respond with locally cached response data. Accordingly, the reverse proxy can mitigate the burden of serving a large number of clients that would otherwise communicate with origin server 220 directly.

In streaming system 200, each of origin server 220, caching server 240 and client device 290 communicates using the same streaming delivery format, labeled "Protocol X". Protocol X may be any one of the known HTTP-based adaptive streaming delivery formats.

Figure 3:
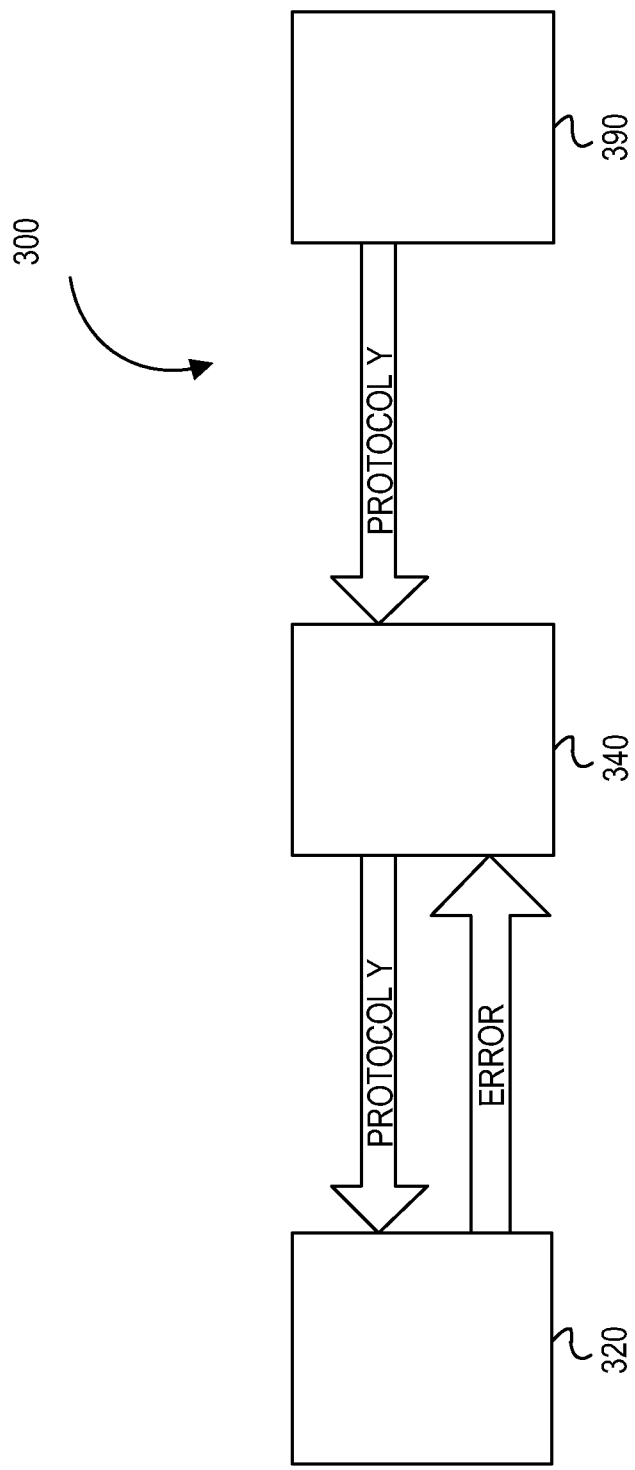
FIG. 3 illustrates another prior art streaming system.

Referring now to FIG. 3, there is illustrated another streaming system 300, comprising origin server 320, caching server 340 and client device 390. Each element of streaming system 300 is generally analogous to its counterpart in streaming system 200. However, whereas origin server 320 is configured to communicate using the Protocol X delivery format, both caching server 340 and client device 390 are configured to communicate using only a different "Protocol Y" delivery format.

Accordingly, when client device 390 attempts to transmit a request in the client delivery format to origin server 320 (either directly or via caching server 340), origin server 320 may respond with an error, due to the unrecognized delivery format.

Figure 4:
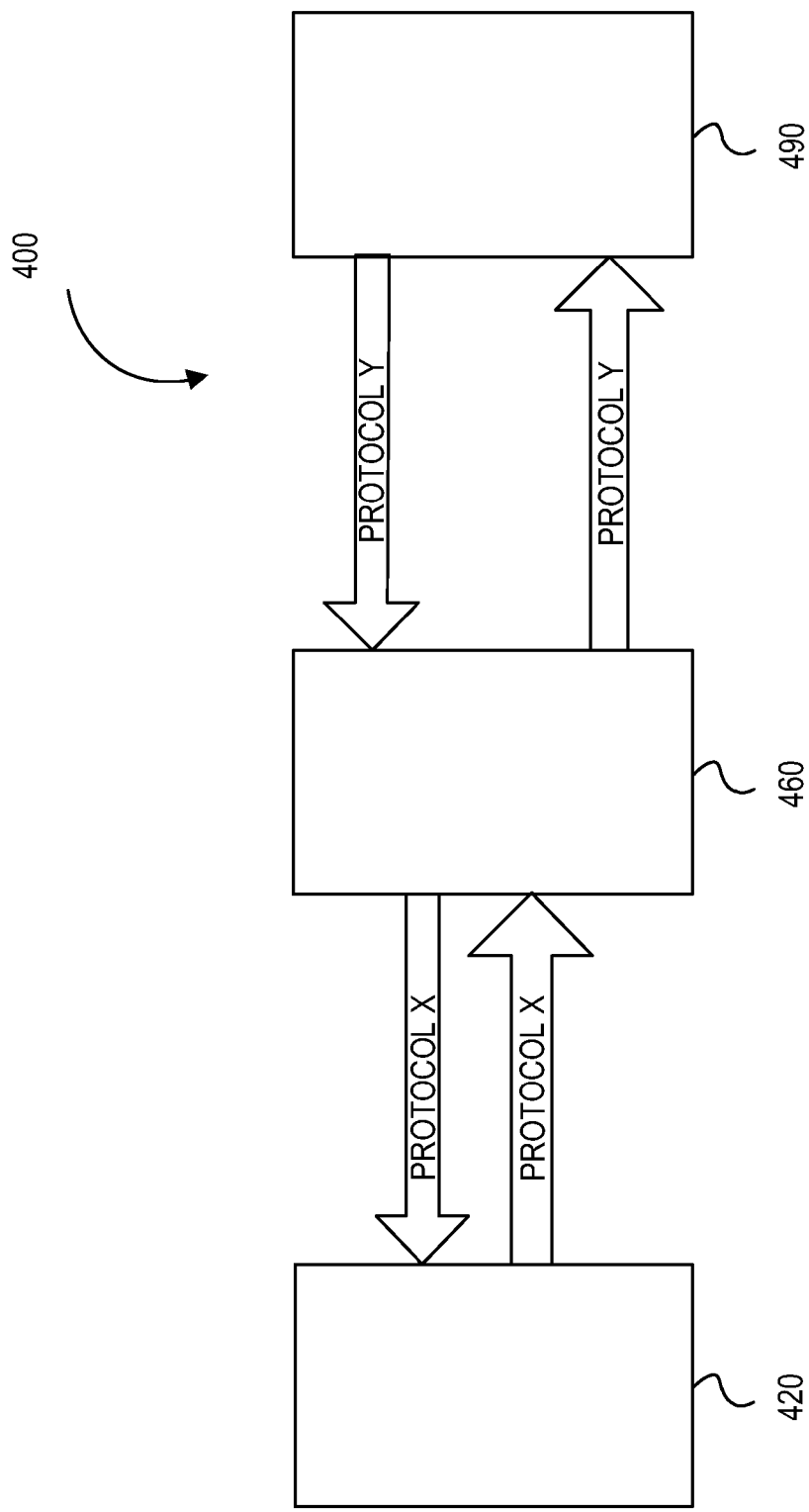
FIG. 4 illustrates a simplified streaming system according to some embodiments.

Referring now to FIG. 4, there is illustrated an exemplary simplified streaming system 400. Streaming system 400 comprises an origin server 420 and a client device 490, which are generally analogous to origin server 320 and client device 390, respectively. Streaming system 400 further comprises an intermediate server 460.

Intermediate server 460 can comprise a data storage device, a memory and a processor configured to provide a reverse translating proxy service as described herein.

As illustrated, client device generates a content request and transmits the request to intermediate server 460 using Protocol Y (i.e., the client delivery format). Intermediate server 460 identifies the delivery format of the content request and attempts to forward the content request to origin server 420 using the Protocol Y delivery format. If intermediate server 460 determines that origin server 420 does not support the client delivery format, then intermediate server 460 translates the content request into another delivery format (e.g., Protocol X), which is supported by origin server 420.

Intermediate server 460 can then retrieve the requested response content from origin server 420 and translate the response content back into the client delivery format, for delivery to client device 490.

Accordingly, both origin server 420 and client 490 can communicate using their respective supported delivery formats. Furthermore, in some embodiments, intermediate server 460 can store (e.g., cache) the retrieved content in the origin delivery format, the client delivery format, or both, for later delivery in response to another request, which may arrive using yet another delivery format.

A reverse proxy is commonly deployed in the context of HTTP services, and so techniques for accepting a request and forwarding the request to an appropriate host (e.g., origin server) are well understood. However, known reverse proxies generally only forward the same request URL (Uniform Resource Locator) as was received from the client device.

In contrast, intermediate server 460 can change the received request URL, based on the delivery format supported by the origin server and a number of other factors described herein.

The received request URL (i.e., the client request URL) generally comprises three principle components: the "domain", representing the host name of the origin server within the URL; the "location", representing the directory or path structure used by the origin server to identify a specific resource; and the media identifier, representing the part of the requested URL that identifies a specific resource, such as the manifest or a content fragment.

For example, for a Manifest request by a client using an Apple delivery format, the client request URL may be "http://www.example.com/ABR/video1/BBB.m3u8".

Accordingly, the domain is "www.example.com", the path is "/ABR/video1/", and the media identifier is "BBB.m3u8".

In at least some embodiments, the domain and path components of the URL may be left unchanged. However, the media identifier can be changed depending on the needs of the delivery format supported by the origin server (i.e., the origin delivery format).

In the above example of the Apple delivery format, if the origin server supported only the Microsoft Smooth Streaming delivery format, then the media identifier would be changed from "BBB.m3u8" to "BBB.ism/Manifest". The domain and path could be left intact.

Figure 5:
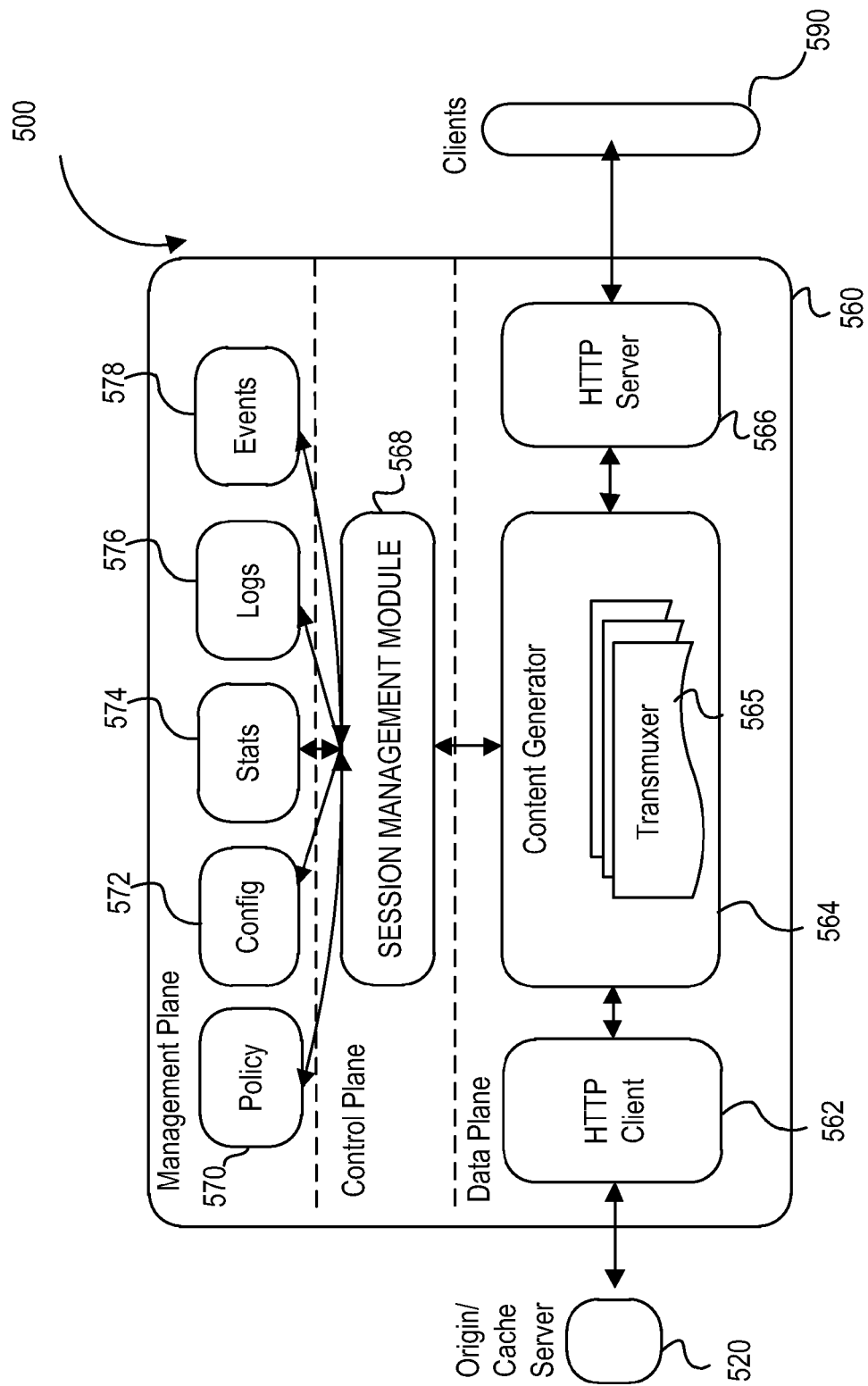
FIG. 5 illustrates an exemplary simplified system block diagram of an intermediate server, part of an exemplary streaming system.

Referring now to FIG. 5, there is illustrated an exemplary simplified system block diagram of an intermediate server 560, which is part of streaming system 500. Streaming system 500 is generally analogous to streaming system 400. Similarly, each origin server 520 and client device 590 may be generally analogous to origin server 420 and client device 490, respectively.

Intermediate server 560 may be conceptually organized into three planes, including a data plane, a control plane and a management plane.

HTTP server 566 (which may also be referred to as an intermediate server module) can be configured to receive HTTP requests (e.g., comprising client request URLs) from client devices 590, and to forward the received requests to content generator 564. HTTP server 566 can also be configured to deliver response data corresponding to the HTTP requests once received from content generator 564.

HTTP server 566 may perform initial validation of each HTTP request, for example, to ensure the request conforms to the HTTP protocol. Generally, HTTP server 566 can be optimized to provide high performance and to serve a large number of concurrent connections.

HTTP client 562 (which may also be referred to as an intermediate client module) can be configured to receive HTTP requests from content generator 564 and to forward the request on to the appropriate origin server 520. Similarly, HTTP client 562 can be configured to deliver response data to content generator 564, when received from each origin server 520 in response to an HTTP request. Generally, HTTP client 562 can be optimized for high performance (e.g., high throughput).

Content generator 564 can be configured to move requests from one component (e.g., HTTP server 566, HTTP client 562, control plane) to another, and to link those requests between each of the other components. In addition, content generator 564 can parse requests to determine how the request may be best serviced.

For example, content generator 564 may identify that a request using the Protocol X delivery format is destined to an origin server using the Protocol Y delivery format, and may thus determine that a Protocol Y-X transmuxer is required to service the request.

In addition, content generator 564 may retrieve policies and client session information from the control plane (or management plane) in order to determine whether, or how, to honor a client request.

Management plane may comprise a policy module 570 for storing policies, a configuration module 572 for storing configuration settings, statistics tracking module 574 for storing and tracking statistics relating to the system, log module 576 for storing logs and an events module 578 for tracking system events.

Content generator 564 may comprise one or more transmuxers 565, which are responsible for the conversion of the requests and responses from one adaptive streaming delivery format to another. Each transmuxer 565 may be specific to both the ingress and egress delivery formats. For example, a Microsoft Smooth Streaming to Apple transmuxer is likely to be different than a Microsoft Smooth Streaming to Adobe transmuxer.

Each transmuxer 565 may be configured to parse a client request to determine if it is a valid request (e.g., conforms to the delivery format requirements), to determine whether the request is for a manifest or content fragment, and the like.

If a client request will require more than one origin server request to be fulfilled, then the appropriate transmuxer 565 may also determine which origin server requests are required to fulfill the client request, and generate and forward the corresponding requests.

Transmuxer 565 can also convert both manifest and content fragment requests and responses between the origin delivery format and the client delivery format.

In some embodiments, transmuxer 565 is comprised of two or more modules. A first module, the mapping module, can provide manifest and protocol services, whereas the second module, the container conversion module, provides fragment re-packaging services. Re-packaging comprises two functions: extraction (e.g., the process of removing samples from the origin fragment); and packing (e.g., the process of placing samples into a new container format for fragment delivery to the client).

The control plane may primarily comprise a session management module 568. Session management module 568 serves to manage client sessions initiated by client devices 590, and to provide session-based policy or configuration information to content generator 564. Accordingly, session management module 568 may interact with various management plane components. In addition, session management module 568 may create, read and update client session information based on its interactions with the content generator 564.

Session management module 568 may maintain an active client session table, which can include relevant information and context needed for the extraction process.

Session management module 568 may also cooperate with content generator 564 to provide fast lookups of client session data.

In some embodiments, session management module 568 may also perform policy management functions, which can include maintaining a table of configured policies, determining and assigning policies to clients (e.g., based on the client, domain and content attributes), and statistics collection and reporting.

Statistics collection and reporting may comprise sending client session updates to a logging server or database to record when a session is established and destroyed.

Figure 6:
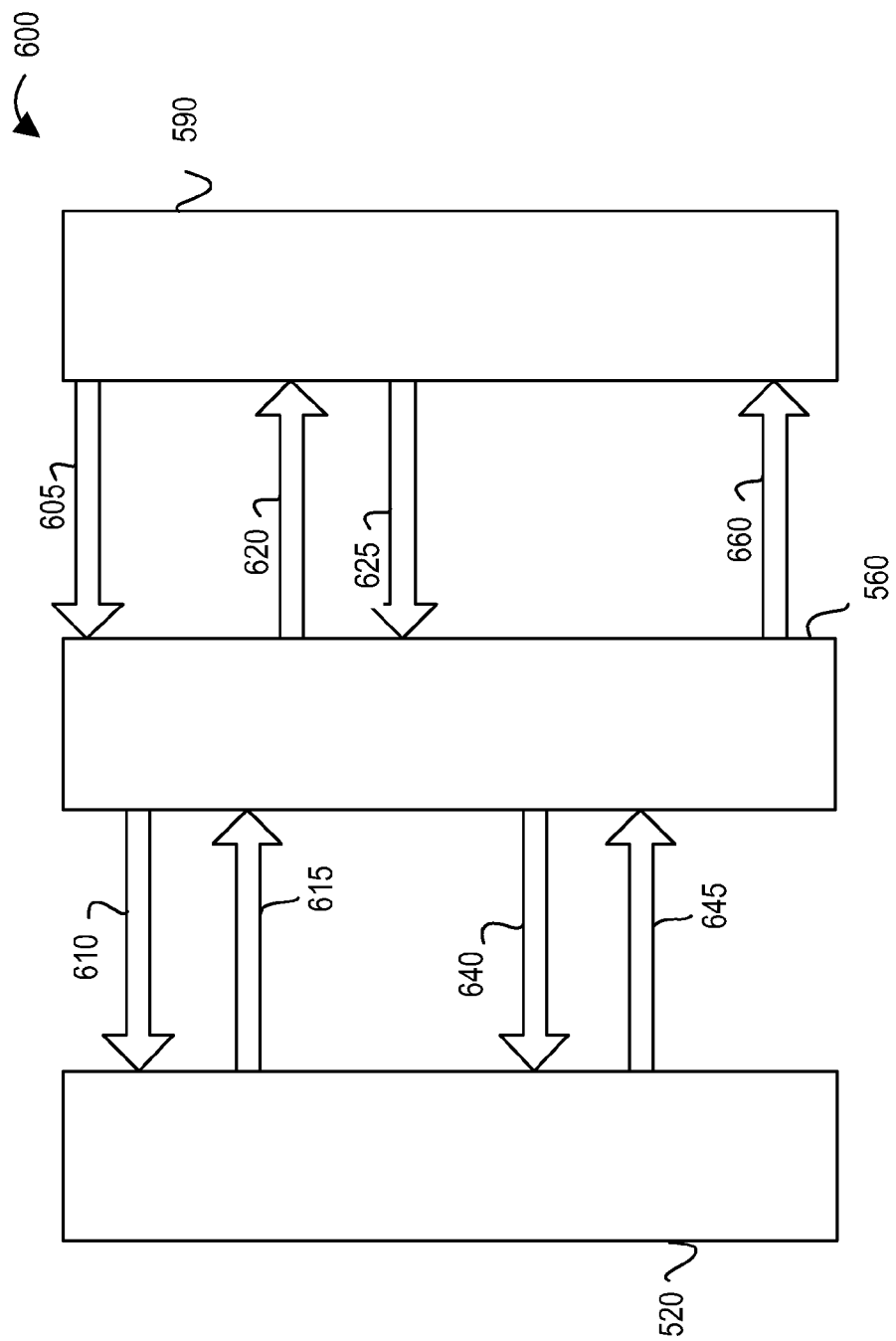
FIG. 6 illustrates a simplified call flow for the system of FIG. 5.

Referring now to FIG. 6, there is illustrated a simplified call flow for the system of FIG. 5.

One of the challenges inherent in the translation process is that the intermediate server has limited information at the beginning of a streaming session. When a manifest request is first received from a client device, the origin delivery format may not be readily apparent from the client request URL. For example, an origin server may support more than one origin delivery format that can be used to fulfill the manifest request. Accordingly, intermediate server 560 must determine a suitable translation from the client delivery format to the origin delivery format. Once a suitable translation is identified, the intermediate server can retrieve the origin manifest and generate a client manifest. Optionally, the intermediate server can store the origin delivery format corresponding to the request URL to allow future manifest and content fragment requests for that request URL to be expedited.

When a client request is first received, the content generator 564 can attempt to identify whether the request is an initial manifest request. For example, content generator 564 may examine the request URL to determine whether it contains a unique identifier (e.g., UUID) previously generated or used by content generator 564, which would indicate that a session already exists, and that the request is not an initial manifest request.

More generally for all types of client requests, content generator 564 may parse the URL in the HTTP request to determine if it contains a specific signature in the URL that indicates which delivery format is being used, and which transmuxer 565 should be used to handle the request. Each delivery format has a unique specific signature in its manifest request format. For example, the Microsoft Smooth Streaming delivery format has a media identifier component of the URL in the form of "XXXXX.ism/Manifest", where XXXXX is the name of the media asset. In another example, the Adobe delivery format uses a file extension of .f4m to represent a manifest. Similarly, the Apple delivery format uses a file extension of .m3u8 to represent a manifest. Accordingly, in some embodiments, content generator 564 may simply use the media identifier component of the request URL to determine whether the request corresponds to a manifest.

Manifest files are generally used to provide an index of the content fragments that make up a multimedia item, and to provide metadata about available streaming options. For example, a manifest file may specify a delivery format type, delivery format version, time scale, content duration, fragment durations, fragment encoding parameters (e.g., bitrate, codec, size), fragment URLs or URL templates, and other data.

Accordingly, the manifest provides enough information to a client device for the client device to determine the different bitrates supported, how the video and audio has been encoded, and how the client can generate requests for specific fragments.

An example Microsoft Smooth Streaming manifest file is shown below.

```
<?xml version="1.0" encoding="utf-16"?>
<SmoothStreamingMedia
      MajorVersion="2"
      MinorVersion="0"
      TimeScale="10000000"
      Duration="200000000">
   <StreamIndex
         Type="video"
         TimeScale="10000000"
         Name="video"
         Chunks="10"
         QualityLevels="6"
         Url="QualityLevels({bitrate})/Fragments(video={start time})"
         MaxWidth="1280"
         MaxHeight="720"
         DisplayWidth="1280"
         DisplayHeight="720">
      <QualityLevel
            Index="0"
            Bitrate="3500000"
            NominalBitrate="3518464"
            BufferTime="1000"
            FourCC="H264"
            MaxWidth="1280"
            MaxHeight="720"
            CodecPrivateData="00000001274D401F965402802DD80B440000
            03000400000300C3B40035B006B8BDEF82800000000128EF060
            CC8"
            NALUnitLengthField="4"
      />
      <QualityLevel
            Index="1"
            Bitrate="2500000"
            NominalBitrate="2514944"
            BufferTime="1000"
            FourCC="H264"
            MaxWidth="853"
            MaxHeight="480"
            CodecPrivateData="00000001274D401E965406C1EF37FF828002
            80B440000003004000000C3B400266004CEBDEF8280000000128
            EF060CC8"
            NALUnitLengthField="4"
      />
      <QualityLevel
            Index="2"
            Bitrate="1500000"
            NominalBitrate="1509376"
            BufferTime="1000"
            FourCC="H264"
            MaxWidth="640"
            MaxHeight="360"
            CodecPrivateData="00000001274D401E965405017FCB80B44000
            0003004000000C3AB802E1005C4BDEF8280000000128EF060CC
            8"
            NALUnitLengthField="4"
      />
      <QualityLevel
            Index="3"
            Bitrate="1000000"
            NominalBitrate="1005568"
            BufferTime="1000"
            FourCC="H264"
            MaxWidth="568"
            MaxHeight="320"
            CodecPrivateData="00000001274D401E965404814F2FFF814001
            3FB440000003004000000C3A3003D6007AEBDEF828000000012
            8EF060CC8"
            NALUnitLengthField="4"
      />
      <QualityLevel
            Index="4"
            Bitrate="500000"
            NominalBitrate="502784"
            BufferTime="1000"
```

-continued

```
                FourCC="H264"
                MaxWidth="568"
                MaxHeight="320"
                CodecPrivateData="00000001274D401E965404814F2FFF814001
                3FB4400000030040000000C39A803D6007B0BDEF8280000000128
                EF060CC8"
                NALUnitLengthField="4"
        />
        <QualityLevel
                Index="5"
                Bitrate="300000"
                NominalBitrate="301568"
                BufferTime="1000"
                FourCC="H264"
                MaxWidth="568"
                MaxHeight="320"
                CodecPrivateData="00000001274D401E965404814F2FFF814001
                3FB4400000030040000000C39A8024D0049EBDEF8280000000128
                EF060CC8"
                NALUnitLengthField="4"
        />
        <c
                n="0"
                d="20000000"
        />
        <c
                n="1"
                d="20000000"
        />
        <c
                n="2"
                d="20000000"
        />
        <c
                n="3"
                d="20000000"
        />
        <c
                n="4"
                d="20000000"
        />
        <c
                n="5"
                d="20000000"
        />
        <c
                n="6"
                d="20000000"
        />
        <c
                n="7"
                d="20000000"
        />
        <c
                n="8"
                d="20000000"
        />
        <c
                n="9"
                d="20000000"
        />
</StreamIndex>
<StreamIndex
        Type="audio"
        TimeScale="10000000"
        Name="audio"
        Chunks="10"
        QualityLevels="1"
        Url="QualityLevels({bitrate})/Fragments(audio={start time})">
        <QualityLevel
                Index="0"
                Bitrate="64000"
                SamplingRate="44100"
                Channels="2"
                BitsPerSample="16"
                PacketSize="4"
                AudioTag="255"
```

```
            FourCC="AACL"
            CodecPrivateData="1210"
        />
        <c
            n="0"
            d="20201360"
        />
        <c
            n="1"
            d="20201361"
        />
        <c
            n="2"
            d="20201360"
        />
        <c
            n="3"
            d="20201361"
        />
        <c
            n="4"
            d="20201360"
        />
        <c
            n="5"
            d="20201361"
        />
        <c
            n="6"
            d="20201360"
        />
        <c
            n="7"
            d="20201361"
        />
        <c
            n="8"
            d="20201360"
        />
        <c
            n="9"
            d="20201361"
        />
    </StreamIndex>
</SmoothStreamingMedia>
```

In contrast to the Microsoft Smooth Streaming delivery format, the Apple HLS delivery format uses a multi-tiered manifest approach, in which an initial manifest refers to further lower-level manifests. An initial manifest is shown below:

```
#EXTM3U
#EXT-X-STREAM-INF:
PROGRAM-ID=1,
BANDWIDTH=300000
http://www.example.com/ABR/Video1/bbb_6layers_2sec_300000.m3u8
#EXT-X-STREAM-INF:
PROGRAM-ID=1,
BANDWIDTH=500000
http://www.example.com/ABR/Video1/bbb_6layers_2sec_500000.m3u8
#EXT-X-STREAM-INF:
PROGRAM-ID=1,
BANDWIDTH=1000000
http://www.example.com/ABR/Video1/
bbb_6layers_2sec_1000000.m3u8
#EXT-X-STREAM-INF:
PROGRAM-ID=1,
BANDWIDTH=1500000
http://www.example.com/ABR/Video1/
bbb_6layers_2sec_1500000.m3u8
#EXT-X-STREAM-INF:
PROGRAM-ID=1,
BANDWIDTH=2500000
http://www.example.com/ABR/Video1/
bbb_6layers_2sec_2500000.m3u8
#EXT-X-STREAM-INF:
PROGRAM-ID=1,
BANDWIDTH=3500000
http://www.example.com/ABR/Video1/
bbb_6layers_2sec_3500000.m3u8
```

A lower level manifest, for the 300000 kbps stream above, is shown below:

```
#EXTM3U
#EXT-X-TARGETDURATION:2
#EXT-X-MEDIA-SEQUENCE:0
#EXTINF:
2,
http://www.example.com/ABR/Video1/bbb_6layers_2sec_300000_0.ts
#EXTINF:
2,
http://www.example.com/ABR/Video1/bbb_6layers_2sec_300000_1.ts
#EXTINF:
2,
http://www.example.com/ABR/Video1/bbb_6layers_2sec_300000_2.ts
#EXTINF:
2,
http://www.example.com/ABR/Video1/bbb_6layers_2sec_300000_3.ts
#EXTINF:
```

```
2,
http://www.example.com/ABR/Video1/bbb_6layers_2sec_300000_4.ts
#EXTINF:
2,
http://www.example.com/ABR/Video1/bbb_6layers_2sec_300000_5.ts
#EXTINF:
2,
http://www.example.com/ABR/Video1/bbb_6layers_2sec_300000_6.ts
#EXTINF:
2,
http://www.example.com/ABR/Video1/bbb_6layers_2sec_300000_7.ts
#EXTINF:
2,
http://www.example.com/ABR/Video1/bbb_6layers_2sec_300000_8.ts
#EXTINF:
2,
http://www.example.com/ABR/Video1/bbb_6layers_2sec_300000_9.ts
#EXT-X-ENDLIST
```

In contrast, the Adobe delivery format identifies fragment numbers and their associated timeline in a field called "BootStrap", which is encoded and compressed in the manifest. An example of an Adobe manifest is shown below:

```
<?xml version="1.0" encoding="UTF-8"?>
<manifest
        xmlns="http://ns.adobe.com/f4m/1.0">
        <id>
                http://www.example.com/ABR/Video1/bbb_6layers_2sec
        </id>
        <streamType>
                Recorded
        </streamType>
        <deliveryType>
                streaming
        </deliveryType>
        <duration>
                20.000000
        </duration>
        <baseURL>
                http://www.example.com/ABR/Video1/
        </baseURL>
        <bootstrapInfo
                profile="named"
                id="bootstrap0">
                AAAAemFic3QAAAAAAAAAQAAAAPoAAAAAAAJGeoAAAAAAAAAA
                AAAAAAAQAAABlhc3J0AAAAAAAAAABAAAAAQAAASsBAAAANWFm
                cnQAAAAAAAAD6AAAAACAAAAAQAAAAAAAAAAAAAH0AAAASsAAA
                AAAAkYlAAAAcoA
        </bootstrapInfo>
        <media
                streamId="bbb_6layers_2sec_300000_0"
                url="bbb_6layers_2sec_300000_300000"
                bitrate="300"
                bootstrapInfoId="bootstrap0"
        />
        <media
                streamId="bbb_6layers_2sec_500000_1"
                url="bbb_6layers_2sec_500000_500000"
                bitrate="500"
                bootstrapInfoId="bootstrap0"
        />
        <media
                streamId="bbb_6layers_2sec_1000000_2"
                url="bbb_6layers_2sec_1000000_1000000"
                bitrate="1000"
                bootstrapInfoId="bootstrap0"
        />
        <media
                streamId="bbb_6layers_2sec_1500000_3"
                url="bbb_6layers_2sec_1500000_1500000"
                bitrate="1500"
                bootstrapInfoId="bootstrap0"
        />
        <media
                streamId="bbb_6layers_2sec_2500000_4"
                url="bbb_6layers_2sec_2500000_2500000"
                bitrate="2500"
                bootstrapInfoId="bootstrap0"
        />
        <media
                streamId="bbb_6layers_2sec_3500000_5"
                url="bbb_6layers_2sec_3500000_3500000"
                bitrate="3500"
                bootstrapInfoId="bootstrap0"
        />
</manifest>
```

It will be appreciated that the manifest file formats for each delivery format type differ significantly. As a result of this, the request URL types also differ. Accordingly, the delivery format type can typically be determined by pattern-matching the request URL. The use of pattern-matching allows for intermediate server 560 to be upgraded easily in the future with updated pattern-match definitions, as new delivery format types and versions are developed.

Referring again to FIG. 6, at 605, client device 590 transmits a client request (comprising a manifest request URL) to intermediate server 560. Content generator 564 identifies the manifest request URL and hands off the request to the appropriate transmuxer 565.

If origin server 520 is known by intermediate server 560, then transmuxer 565 can immediately generate the appropriate manifest request URL for origin server 520 and transmit the request at 610.

If origin server 520 is not known, then transmuxer 565 may attempt to identify the delivery format types supported by origin server 520, by generating one manifest request URL at a time and forwarding to origin server 520. If origin server 520 rejects a particular generated URL (e.g., an HTTP 404 error response is returned), then transmuxer 565 may repeat the process until a successful response is received. This iterative process may be stopped when transmuxer 565 exhausts all known possibilities for a manifest request URL.

Each transmuxer 565 may have its own configuration file that specifies manifest construction patterns. In one embodiment, the construction patterns may be specified using tag-value pairs, as shown below in Table 3.

TABLE 3

| | |
|---|---|
| [BASE_URL] | base URL of client's manifest request URL, which may consist of [DOMAIN_URL]/[LOCATION_URL] |
| [MEDIA_URL] | media URL of client's manifest request URL |
| [DOMAIN_URL] | domain URL of client's manifest request |
| [LOCATION_URL] | location URL of client's manifest request |
| [EXT_URL] | extension of client's manifest request |

Accordingly, for an example request URL of http://example.com/video_storage/supervideo.m3u8, the [BASE_URL] would be "http://example.com/video_storage", the [DOMAIN_URL] would be "http://example.com", the [LOCATION_URL] would be "video_storage", the [MEDIA_URL] would be "supervideo" and the [EXT_URL] would be "m3u8".

The mapping module of transmuxer 565 can generate a manifest request URL for forwarding to an origin server by inserting the appropriate values into prespecified template patterns specific to each supported delivery format. As each origin server may have minor variations, there may be a plurality of prespecified template patterns for the transmuxer to iterate through, even within a particular protocol type.

For example, origin servers that support the Apple delivery format may have minor variations in the form of a manifest request URL. Accordingly, the prespecified template patterns may include:

```
[BASE_URL]/[MEDIA_URL].m3u8
[BASE_URL]/[MEDIA_URL]/playlist.m3u8
[BASE_URL]/[MEDIA_URL].ism/Manifest(format=m3u8-aapl)
[BASE_URL]/[MEDIA_URL].isml/Manifest(format=m3u8-aapl)
[BASE_URL]/mp4:[MEDIA_URL].mp4/playlist.m3u8
[BASE_URL]/smil:[MEDIA_URL].smil/playlist.m3u8
```

It will be appreciated that various additional patterns could also be prespecified, both for the Apple delivery format and other delivery formats.

As an example, consider a client request in the Microsoft Smooth Streaming delivery format destined to an origin server using the Apple delivery format. The request URL may take the form of "http://example.com/vod/supervideo.ism/Manifest". In this example, the [BASE_URL] would be "example.com/", the [LOCATION_URL] would be "vod/" and the [MEDIA_URL] would be "supervideo".

Accordingly, based on a prespecified pattern for the origin server of "http://[BASE_URL]/[LOCATION_URL][MEDIA_URL].m3u8", the generated request URL for the origin server would be "http://example.com/vod/supervideo.m3u8".

Once a request URL is generated and transmitted at 610, and a successful response—comprising a manifest—received at 615, the mapping module of transmuxer 565 can convert the received manifest from the protocol used by the origin server to that used by the client device.

At this stage, session management module 568 can provide a unique identifier for insertion into the manifest created for client device 590 to identify the streaming session associated with client device 590 and origin server 520.

In some embodiments, the unique identifier may be inserted into the manifest in such a manner as to include a unique session identifier (UUID) in the request URL template. Accordingly, when the client device 590 makes further requests for content fragments, intermediate server 560 can identify that the requests are associated with a particular session. The unique identifier can also be used to determine which transmuxer 565 to use.

The precise location of the inserted identifier may differ according to the manifest type. For example, for certain clients the request URL template can contain parameter strings at the end of the URL. For other clients, the parameters can be inserted into the [LOCATION_URL] element of the request URL template.

As noted above, each type of manifest provides information that describes to the client how to make future requests for either additional manifests or content fragments, in addition to timing information to ensure uninterrupted playback (e.g., fragment duration, bitrate, etc). Accordingly, each manifest type contains similar information, which may be formatted in a different manner.

As the fragment sizes and fragment structure for each protocol may differ, it may be necessary to retrieve multiple content fragments from the origin server to fulfill a particular client request. For example, in some protocols, each fragment contains only a single media type (e.g., only video or only audio). Accordingly, to achieve playback of audio-visual content requires retrieving both a video fragment and an audio fragment. However, in some other protocols, both video and audio content may be multiplexed together in a single fragment, thus requiring only the single fragment to achieve playback.

Figure 7:
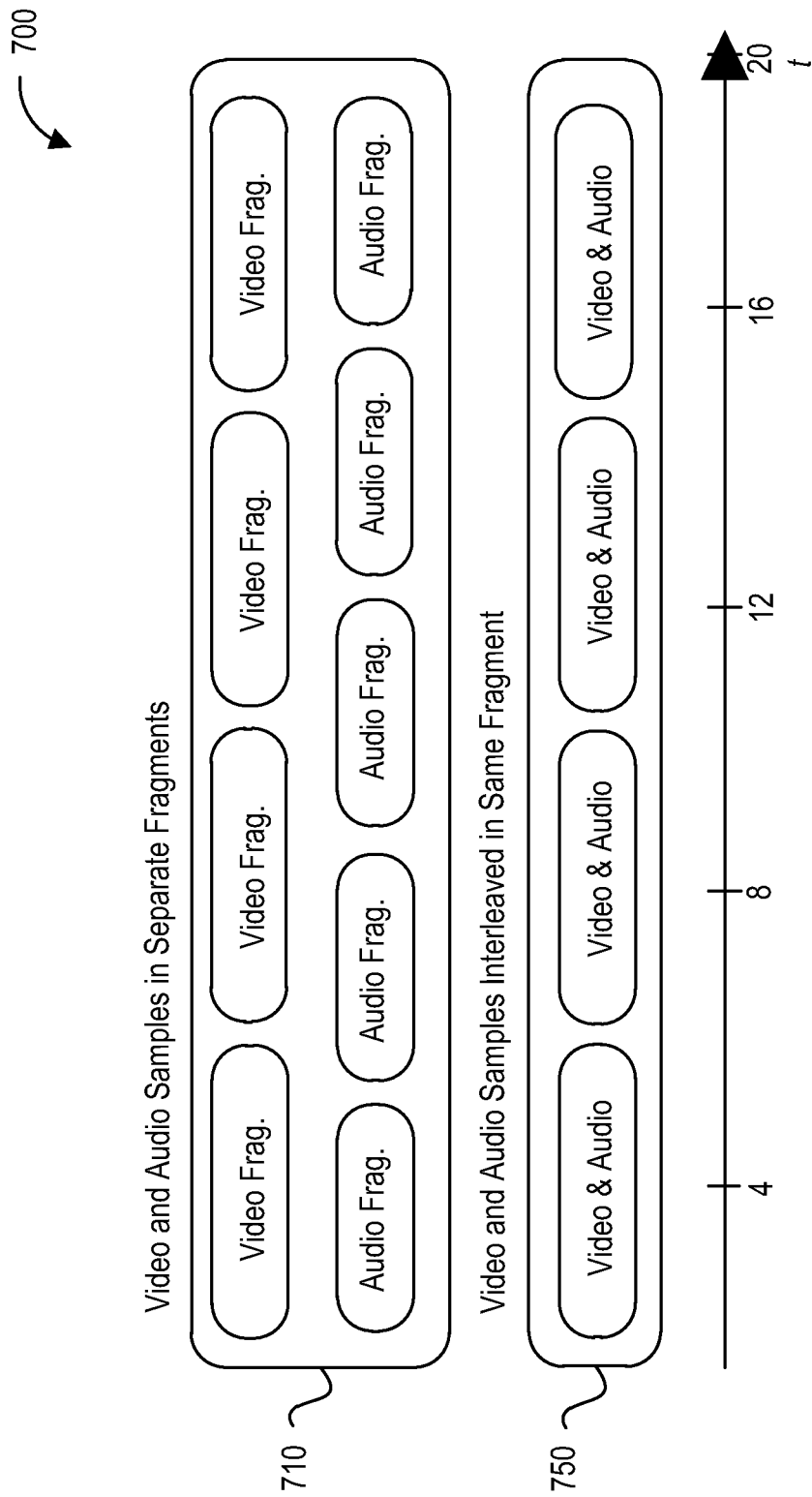
FIG. 7 illustrates an exemplary video and audio fragment mapping on a time axis.

Referring now to FIG. 7, there is illustrated an exemplary video and audio fragment mapping on a time axis. Content item 710 is comprised of four video fragments having a duration of 5 seconds each, and five audio fragments having a duration of 4 seconds each. In contrast, content item 750 is comprised of four content fragments having a duration of 5 seconds each, where each content fragment contains interleaved video and audio data.

It will be appreciated that when different media types separated into respective separate fragments (e.g., audio and video), the fragments may not have the same duration. However, in an interleaved format, it may be expected that all the video and audio samples for a given duration of a content item are contained in a single particular fragment.

Accordingly, when converting between manifests that represent a segregated model versus an interleaved model, a transmuxer mapping module may need to determine how to represent the timing and duration of the various content fragments in the target manifest.

In some embodiments, the video fragments may be chosen as a primary timing source. Accordingly, if a transmuxing conversion is from a segregated source to an interleaved source, then the duration of the interleaved fragments would be based on the duration of the video fragments in the segregated source. Conversely, when a transmuxing conversion is from an interleaved source to a segregated source, the duration of the interleaved fragment may be used for both the video and the audio fragment.

To assist a mapping module of transmuxer 565 in the translation of fragment requests from a client delivery format to the origin delivery format, one or more Session Fragment Mapping Tables can be created for each session when an initial manifest is generated for a client. As described above, each fragment represents a specific time span within a content item (media asset) and the manifests that are provided to the client describe how to create a fragment request for each specific time span.

The Session Fragment Mapping Tables can comprise a timeline of the fragments from the origin manifest and a corresponding timeline of the fragments in the client manifest. An exemplary pair of Session Fragment Mapping Tables is shown below in Tables 5A and 5B. Accordingly, each mapping module can determine which fragments to request from the origin server to fulfill a request from the client device.

TABLE 5A

| Origin Manifest Type = Microsoft | | |
|---|---|---|
| Video Bitrates | | 300 kbps |
| | | 500 kbps |
| | | 1000 kbps |
| | | 1500 kbps |
| | | 2500 kbps |
| Audio Bitrates | | 64 kbps |
| | Start Time | Duration |
| Video Fragments | | |
| 1 | 0 | 2000 |
| 2 | 2000 | 2000 |
| 3 | 4000 | 2000 |
| ... | ... | ... |
| 30 | 58000 | 2000 |
| Audio Fragments | | |
| 1 | 0 | 1500 |
| 2 | 1500 | 1500 |
| 3 | 3000 | 1500 |
| ... | ... | ... |
| 40 | 58500 | 1500 |

TABLE 5B

| Target Manifest Type = HLS | | | |
|---|---|---|---|
| Video & Audio Bitrates | | 364 kbps | |
| | | 564 kbps | |
| | | 1064 kbps | |
| | | 1564 kbps | |
| | | 2564 kbps | |
| Fragments | Start Time | Duration | URL |
| 1 | 0 | 2000 | Seq0 |
| 2 | 2000 | 2000 | Seq1 |
| 3 | 4000 | 2000 | Seq2 |
| ... | ... | ... | ... |
| 30 | 58000 | 2000 | Seq29 |

Moreover, a mapping module of transmuxer 565 may select different length fragment durations to deliver to the client, which need not be based on the duration of the origin fragment. For example, the client manifest may define fragments with a duration of 10 seconds, whereas the origin manifest may contain fragments with a duration of 2 seconds. Using the Session Fragment Mapping Tables, the mapping module can thereby determine that it will need to retrieve 5 origin fragments in order to service a single client fragment request.

Once the necessary content fragments are identified and retrieved, the process of converting container formats can be performed by a container conversion module of transmuxer 565. Fragment container conversion can be conceptually divided into two parts: extraction and packing.

For extraction, the fragments retrieved from the origin server can be "de-muxed" from the origin container format into a set of media descriptors (i.e., parameters that apply to all the samples in the container) and the raw samples of audio and video and their associated timing (PTS and DTS). For packing, the extracted data can be placed into a generic data structure, which can be easily "muxed" into the target container format.

Examples of the media descriptors are shown in Tables 6 to 8 below.

TABLE 6

| Name: | | Video Media Descriptor |
|---|---|---|
| Parameters: | uint64_t | Sample Count |
| | int32_t | Codec - ID representing the codec type |
| | uint64_t | Timescale |
| | uint64_t | Start Time |
| | uint64_t | Duration |
| | int32_t | Framerate |
| | int32_t | Width |
| | int32_t | Height |
| | uint64_t | Bitrate |
| | array::string | PPS, SPS (Picture and Sequence Parameter Sets |

TABLE 7

| Name: | | Audio Media Descriptor |
|---|---|---|
| Parameters: | uint64_t | Sample Count |
| | int32_t | Codec - ID representing the codec type |
| | uint64_t | Timescale |
| | uint64_t | Start Time |
| | uint64_t | Duration |
| | int32_t | Sample Rate |
| | int32_t | Channels |
| | int32_t | Bits per Sample |
| | uint64_t | Bitrate |

TABLE 8

| Name: | | Media Sample Descriptor |
|---|---|---|
| Parameters: | uint64_t | Sample Number |
| | vector<Sample> | Memory Pointer to Sample |
| | uint64_t | PTS—Presentation Timestamp |
| | uint64_t | DTS—Decode Timestamp |

TABLE 8-continued

| Name: | Media Sample Descriptor | |
|---|---|---|
| | uint64_t | Duration |
| | Uint32_t | Length |

Each of the various streaming protocols and delivery formats support a specific container format for content fragments. For example, the Microsoft Smooth Streaming container format is based on the ISO .mp4 format, where fragments are contained in a "MOOF" (movie fragment). Adobe also uses a container format based on the ISO .mp4 format, but further specifies that the samples have additional information based on proprietary additions to the ISO format. Apple uses an MPEG-2 Transport Stream container format. Accordingly, each transmuxer 565 has a container conversion module that is adapted to the type of containers required to extract and pack, in order to meet the requirements of the client and the origin container formats (and thus delivery formats).

It will be appreciated that although reference is made throughout this description to audio and video content, there are other types of content (e.g., closed captions, subtitles) that can also be processed in like manner.

Referring again to FIG. 6, at 620, client device 590 receives the client manifest and determines which content fragments to retrieve. At 625, client device 590 transmits a client fragment request. The client fragment request is processed by the mapping module of transmuxer 565 to generate an origin fragment request in the origin delivery format, which is transmitted to origin server 520 at 640. In some embodiments, a client fragment request may correspond to more than one origin fragment request, as described herein. Likewise, a single origin fragment request may correspond to more than one client request.

At 645, origin server 520 transmits the requested content fragment to transmuxer 565. The container conversion module of transmuxer 565 converts the content fragment from the origin delivery format to the client delivery format. Conversion may involve transmuxing and re-packaging of the content, as described herein.

At 660, intermediate server 560 transmits the requested content fragment to client device 590, using the client delivery format.

Due to the stateless nature of the HTTP protocol and the associated HTTP-based adaptive streaming protocols, there is no inherent ability in the HTTP protocol to know the exact state of any single session. For example, there is no messaging from the client to the server to indicate whether a client has paused a session or has otherwise ended the session (e.g., closed a web browser window). In both cases, a client simply ceases requesting additional data. This creates a challenge in identifying when a session has ended.

In some cases, a client can be in a paused state almost indefinitely, so there is no specific event that can be relied upon to identify when a session has ended permanently. As an intermediate server cannot maintain an indefinite number of client sessions in an active state in perpetuity, there must be a method of identifying ended or "dead" sessions, to enable storage and memory resources to be reused for new sessions.

In one embodiment, the session management module 568 manages a table that identifies the state of all open client sessions. The session management module 568 may periodically, after a predetermined period, "timeout" all active sessions, marking them as being in a timeout state. If a session that is now in a timeout state makes a further fragment request before the next periodic timeout event, the session may be again marked as "active". Conversely, if a session is already in a timeout state and has not made any further fragment requests by the time the "timeout" event reoccurs, the session may be moved to an inactivity queue and marked as a candidate for deletion. The inactivity queue can be based on a first-in first-out (FIFO) approach, such that the sessions that have been inactive the longest are the ones that are removed first. However, sessions that are candidates for deletion need not be removed until intermediate server 160 determines that session resources have been exhausted.

Any session that is marked as "timeout" or "inactive" may be marked as "active" again if a further fragment request associated with that session is received prior to the session being deleted.

Figure 8:
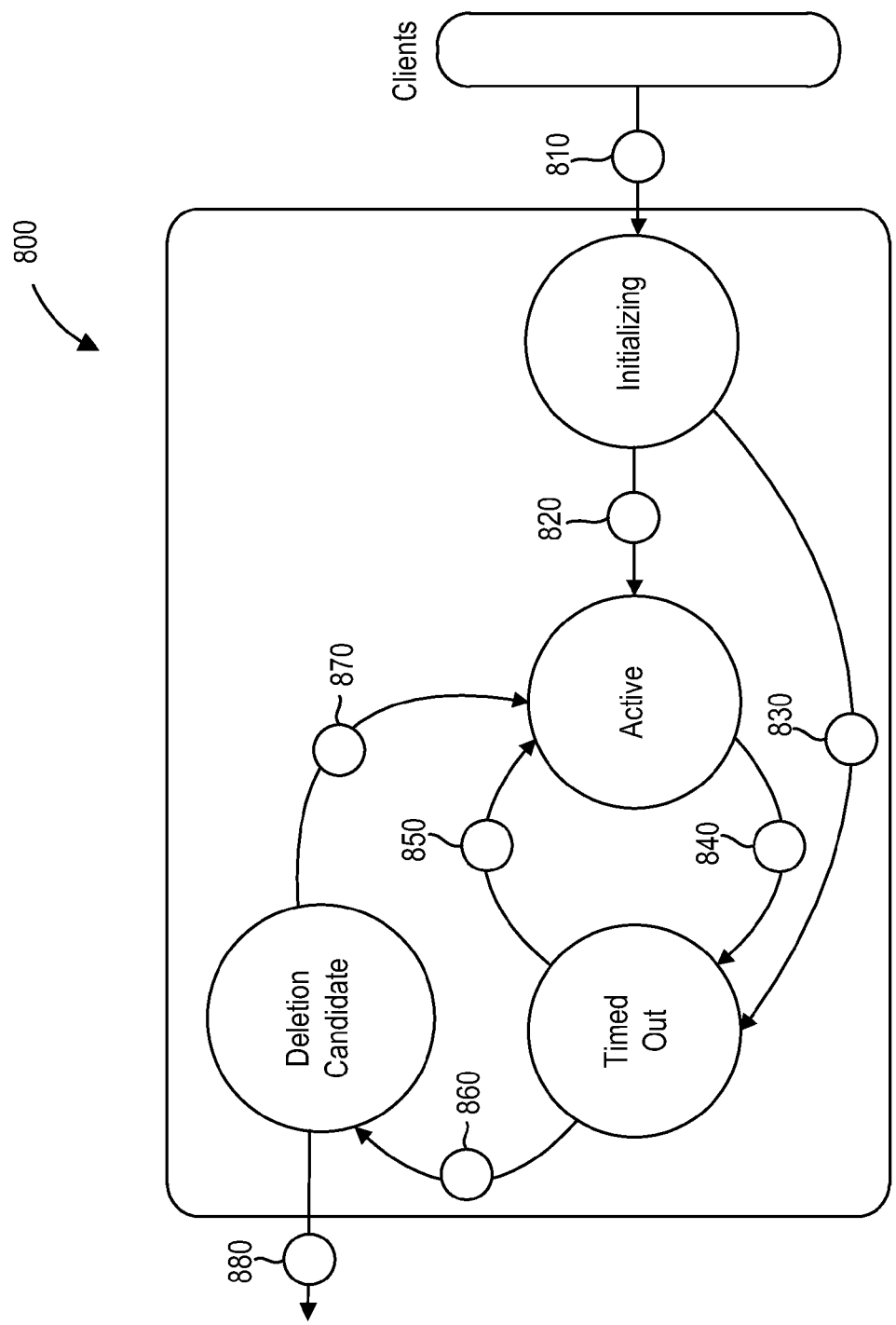
FIG. 8 illustrates an exemplary state diagram that may be used by the session management module of an intermediate server.

Referring now to FIG. 8, there is illustrated an exemplary state diagram that may be used by the session management module of an intermediate server to represent the state of a client session.

When a client manifest request is received at 810, the client session is initiated and marked as initializing. Subsequently, if a further fragment request or manifest request associated with the session is received, the session state is marked as active at 820. If no further requests are received, the session is marked as timed out 830.

At 830 and 840, a periodic process changes the state of all sessions in the initializing state and the active state to timed out. However, if a further fragment request is received in association with a session (at 850), the associated session can be marked as active once again.

At 860, a periodic process changes the state of all sessions in the timed out state to deletion candidates. However, if a further fragment request is received in association with a session (at 870), the associated session can be marked as active once again.

If, at 880, intermediate server 560 determines that it requires session resources (e.g., memory) to service a new session, and there are no older sessions marked as candidates for deletion, then the existing session that is a candidate for deletion can be deleted.

In some embodiments, intermediate server 560 may use the timing of one or more fragment requests to determine a client session state of the client streaming session. For example, if the fragment request timing shows that the requested fragments have timecodes that are separated by a greater amount of time than has actually elapsed or fragments were retrieved out of sequence, then intermediate server 560 can infer that the client performed a seek operation.

Similarly, if the timing determines that an actual elapsed time exceeds a playing time of the one or more fragment requests, then intermediate server 560 can infer that a trick play operation has been performed. In general, trick play operations are operations that result in playback of the content other than in the ordinary frame rate. Examples of trick play operations include a "pause" event, a "fast forward" event, a "rewind" event, a "slow motion" event, and the like.

Figure 9:
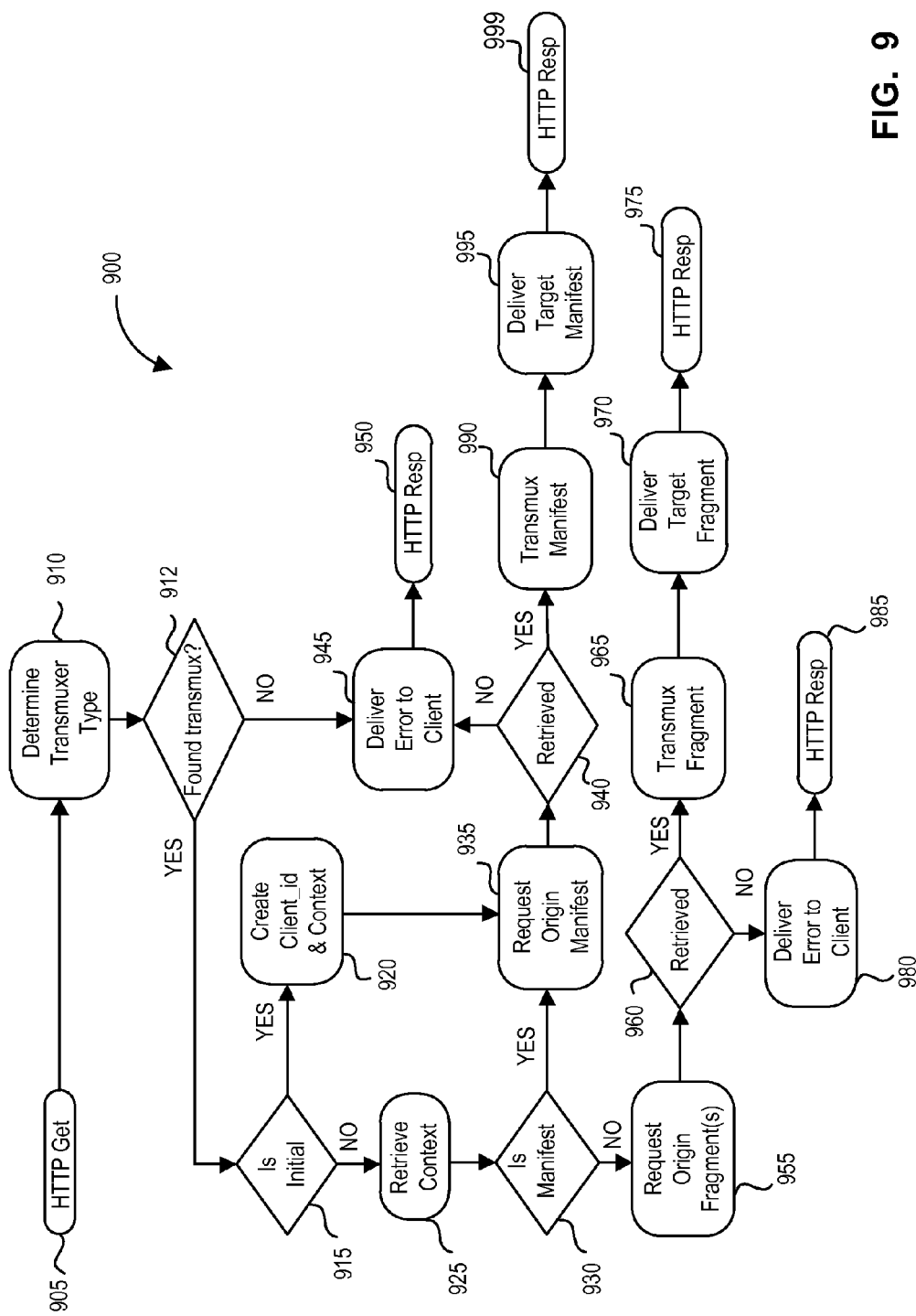
FIG. 9 illustrates an exemplary detailed call flow for the intermediate server of FIG. 5.

Referring now to FIG. 9, there is illustrated an exemplary detailed call flow for the intermediate server of FIG. 5.

Call flow 900 generally illustrates an exemplary message flow between the components of an intermediate server, such as intermediate server 560. In some embodiments, the fundamental model can be non-blocking, in that components use a request/response model for communicating with each other and are thus never in a state where they are "blocked" waiting for a response.

In some embodiments, content generator 564 can be configured to maintain the links between these components while session management module 568 can be configured to manage the overall connection states and policies.

As shown in FIG. 9, there are two primary end-to-end message flows. A first message flow follows from an initial request for manifest information. A second message flow follows from requests for further manifests or media fragments.

Message flows begin at 905, with an HTTP GET request from the client using the client delivery format. At 910, content generator 564 determines which transmuxer 565 should handle the request based on the client delivery format and passes the request to the mapping module of the appropriate transmuxer. If an appropriate transmuxer cannot be found at 912, the message flow may proceed to issue an error message at 945. If an appropriate transmuxer is found, the message flow proceeds to 915.

At 915, the transmuxer determines if the HTTP request is a request for an initial manifest, or a subsequent request. If the request is an initial request, the flow proceeds to 920 where a unique identifier and session context (e.g., state information) are created, as described herein, whereupon the flow proceeds to 935.

If the request is not an initial request, a unique identifier is extracted from the HTTP request and used to retrieve the session state information at 925.

At 930, the transmuxer determines if the request is for a manifest. If the request is for a manifest, the flow proceeds to 935, whereupon a request for the manifest is generated by the mapping module using the origin delivery format (e.g., an intermediate request for the manifest), and transmitted to the origin server.

At 940, the transmuxer determines if a successful response to the request was received. If an error was received, the transmuxer identifies that an error message should be delivered to the client device at 945, and transmits the error message in a corresponding HTTP RESPONSE message at 950.

If the manifest was received successfully, the container conversion module of the transmuxer converts the manifest at 990, as described herein, and identifies that the transmuxed manifest should be delivered to the client device at 995. The transmuxed manifest is transmitted in a corresponding HTTP RESPONSE message at 999.

If, at 930, the transmuxer determines that the request is not for a manifest, the flow proceeds to 955 to transmux the request into the origin server protocol, thereby generating an intermediate request for the content fragment, and transmit the intermediate request for content fragment (or fragments) to the origin server.

At 960, the transmuxer determines if a successful response to the request was received. If an error was received, the transmuxer identifies that an error message should be delivered to the client device at 980, and transmits the error message in a corresponding HTTP RESPONSE message at 985.

If the content fragment were received successfully, the container conversion module of the transmuxer converts the fragment (or fragments) at 965, for example by unpacking the fragments from the origin container format, and identifies that the transmuxed content fragment (or fragments) should be delivered to the client device at 970. The transmuxed content fragment (or fragments) can be packed into the client container format (while remaining in the origin encoding format) and transmitted, using the client delivery format, in a corresponding HTTP RESPONSE message at 975.

Packing may comprise packing multiple fragments into the client container format by reassembling the content fragments, for example where the origin container format and the client container format result in different length segments comprising several fragments.

Figure 10:
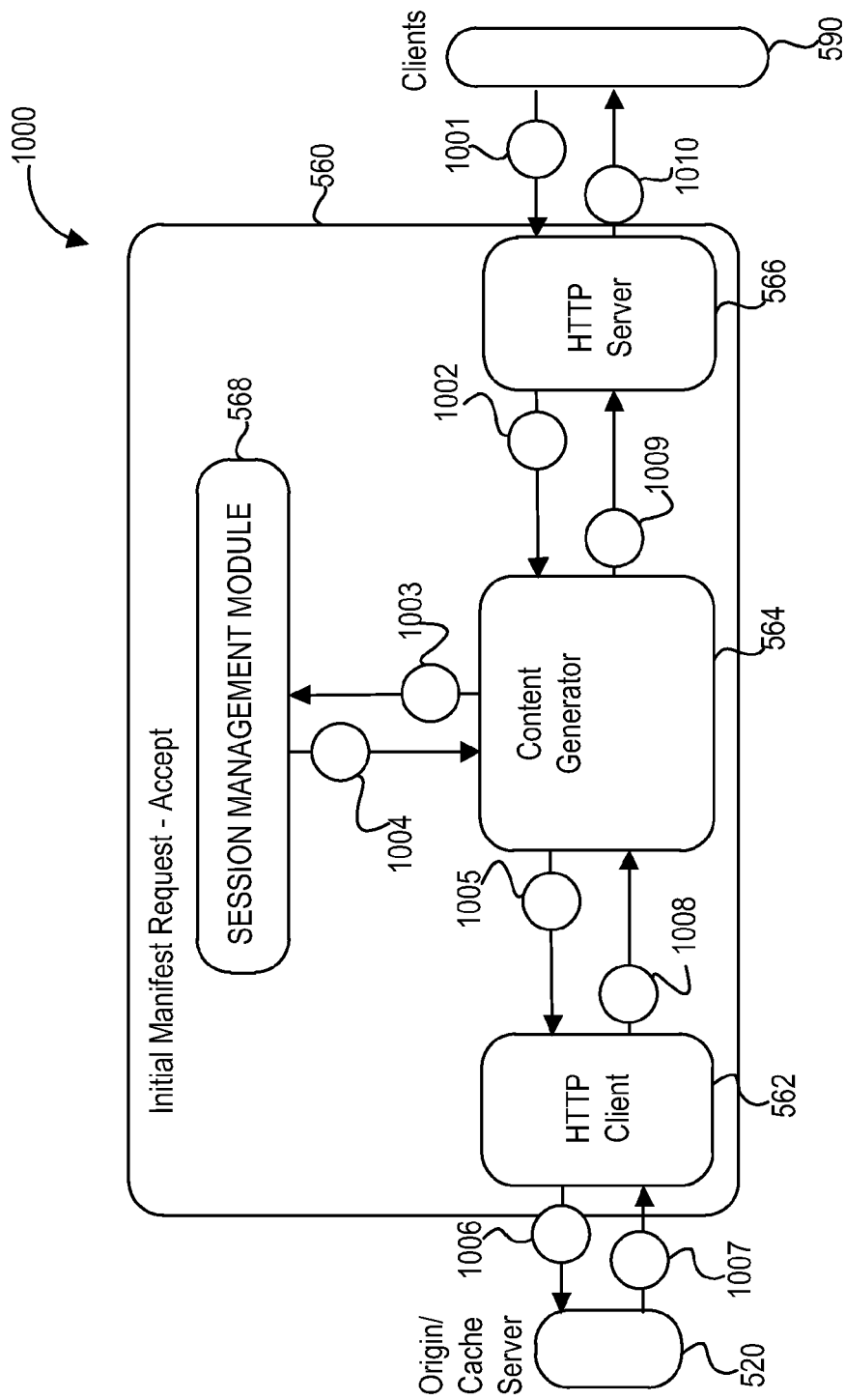
FIG. 10 illustrates an exemplary call flow for accepting an initial manifest request.

Referring now to FIG. 10, there is illustrated an exemplary call flow 1000 for accepting an initial manifest request.

Call flow 1000 begins at 1001, when HTTP server 566 receives an HTTP GET request for a manifest from a client device 590.

At 1002, HTTP server 566 checks the validity of the request and, if the request is valid, forwards the request message to content generator 564 with the requested URL. The forwarded request message may contain message details such as a request identifier, request URL, client device IP address, client identifier (e.g., cookie), user agent, client TCP port, and time of request.

At 1003, content generator 564—for example, the mapping module of transmuxer 565—determines that the request is for an initial manifest request, and notifies session management module 568. The notification may contain details such as the request identifier, session context identifier generated by content generator 564, time stamp, client protocol type, client IP address and the request URL.

Session management module 568 determines whether it can allow the session (e.g., enough resources are available, the client is authorized, etc.) and sends an authorization message to content generator 564, at 1004. The authorization message may comprise the request identifier, the session context identifier generated by content generator 564, a unique identifier (UUID) for the session generated by the session management module 568, a response code, an identifier corresponding to the origin server protocol, and a list of request patterns for the mapping module of transmuxer 565 to attempt to use when formulating a request.

At 1005, the mapping module of transmuxer 565 creates an appropriate request using the origin protocol and forwards the generated request comprising the request identifier and one or more request URLs to HTTP client 562. The request identifier can be used to correlate responses to the transmuxer 565.

At 1006, HTTP client 562 determines the appropriate IP address for origin server 520 and transmits a HTTP GET message with the generated request for an origin manifest.

At 1007, origin server 520 responds with the requested origin manifest file in the origin delivery format.

HTTP client 562 transmits or forwards the requested manifest to content generator 564, at 1008. The response may comprise a request identifier, the one or more request URLs and status codes corresponding to each request.

At 1009, content generator 564 (and a container conversion module of the appropriate transmuxer) generates a client manifest file in the client delivery format from the manifest file received in the origin delivery format, and forwards the client manifest to HTTP server 566.

Finally, at 1010, HTTP server 566 transmits the client manifest to the client device 590.

Figure 11:
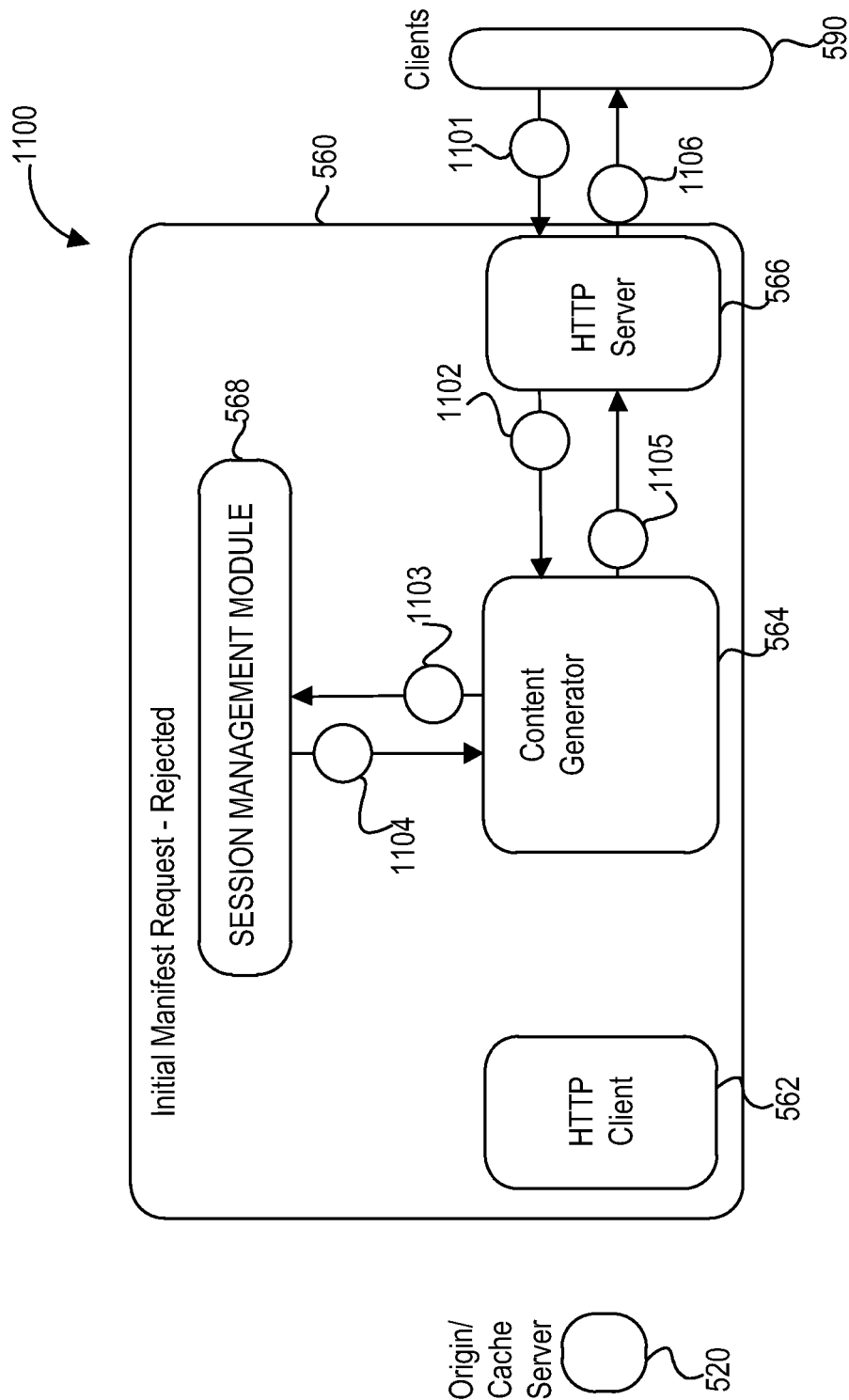
FIG. 11 illustrates an exemplary call flow for a rejected initial manifest request.

Referring now to FIG. 11, there is illustrated an exemplary call flow 1100 for a rejected initial manifest request.

Call flow 1100 begins at 1101, when HTTP server 566 receives an HTTP GET request for a manifest from a client device 590. The request is in the client delivery format.

At 1102, HTTP server 566 checks the validity of the request and, if the request is valid, forwards the request message to content generator 564 with the requested URL.

At 1103, content generator 564 determines that the request is for an initial manifest request, and notifies session management module 568.

Session management module 568 determines that it cannot allow the session (e.g., not enough resources are available, the client is not authorized, etc.) and sends a non-authorization message to content generator 564, at 1104.

At 1105, content generator 564 creates a rejection message (e.g., HTTP error message) and forwards the message to HTTP server 566.

Finally, at 1106, HTTP server 566 transmits the rejection message to the client device 590.

Figure 12:
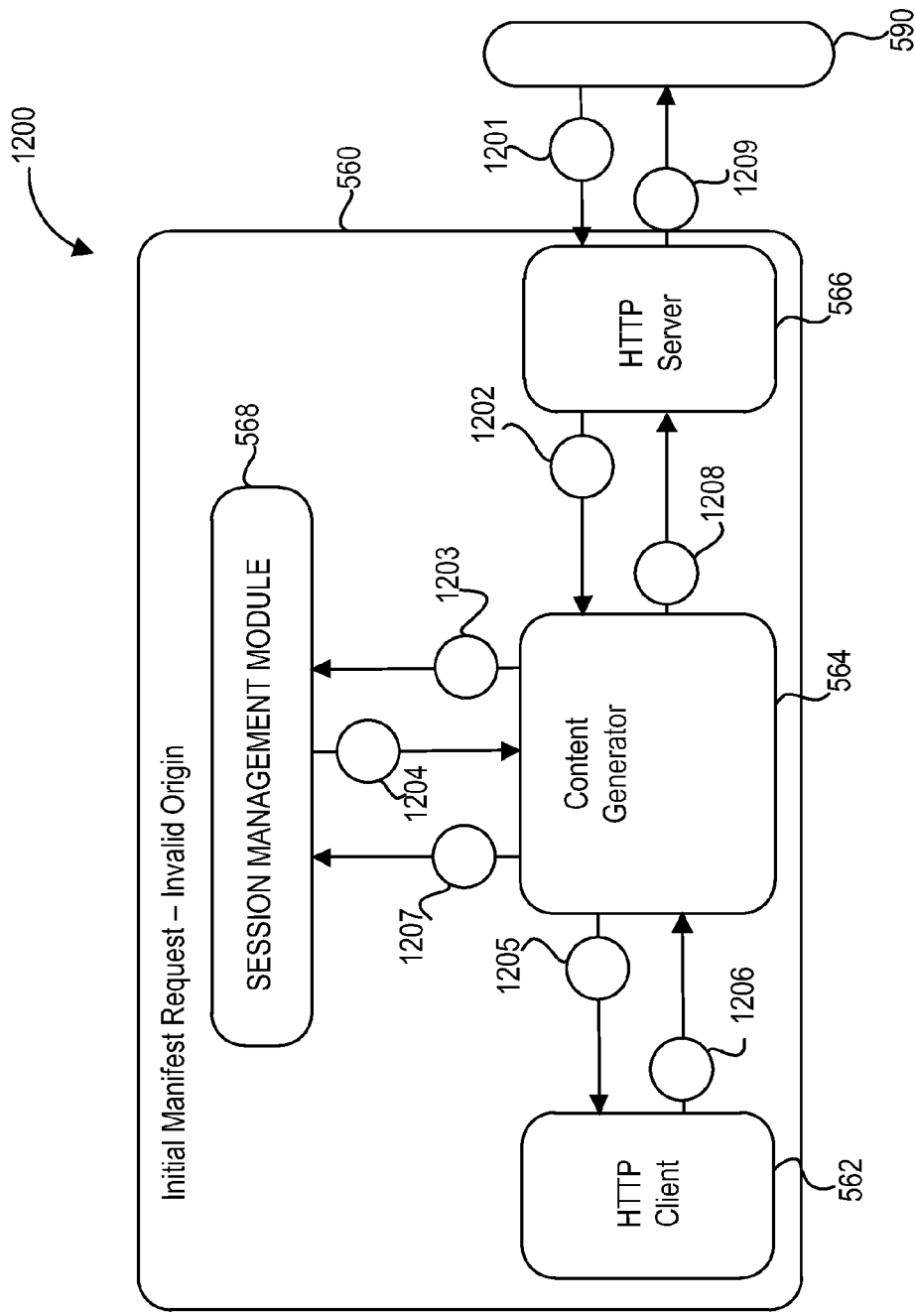
FIG. 12 illustrates an exemplary call flow for an initial manifest request that contains an invalid origin server address.

Referring now to FIG. 12, there is illustrated an exemplary call flow 1200 for an initial manifest request that contains an invalid origin server address.

Call flow 1200 begins at 1201, when HTTP server 566 receives an HTTP GET request for a manifest from a client device 590. The request is in the client delivery format.

At 1202, HTTP server 566 checks the validity of the request and, if the request is valid, forwards the request message to content generator 564 with the requested URL.

At 1203, content generator 564 determines that the request is for an initial manifest request, and notifies session management module 568.

Session management module 568 determines whether it can allow the session (e.g., enough resources are available, the client is authorized, etc.) and sends an authorization message to content generator 564, at 1204.

At 1205, content generator 564 creates an appropriate request using the origin protocol and forwards the generated request to HTTP client 562.

At 1206, HTTP client 562 determines that it cannot connect to the origin server 520 (e.g., because the request contains an invalid origin server address) and sends an error message to content generator 564 with a status indicating a failure connecting to the origin server.

At 1207, content generator 564 determines that the client session should be deleted and sends a deletion message to session management module 568, so that session resources can be reclaimed.

At 1208, content generator 564 sends an error message to HTTP server 566 with an appropriate HTTP error code.

Finally, at 1209, HTTP server 566 transmits the error message to the client device 590.

Figure 13:
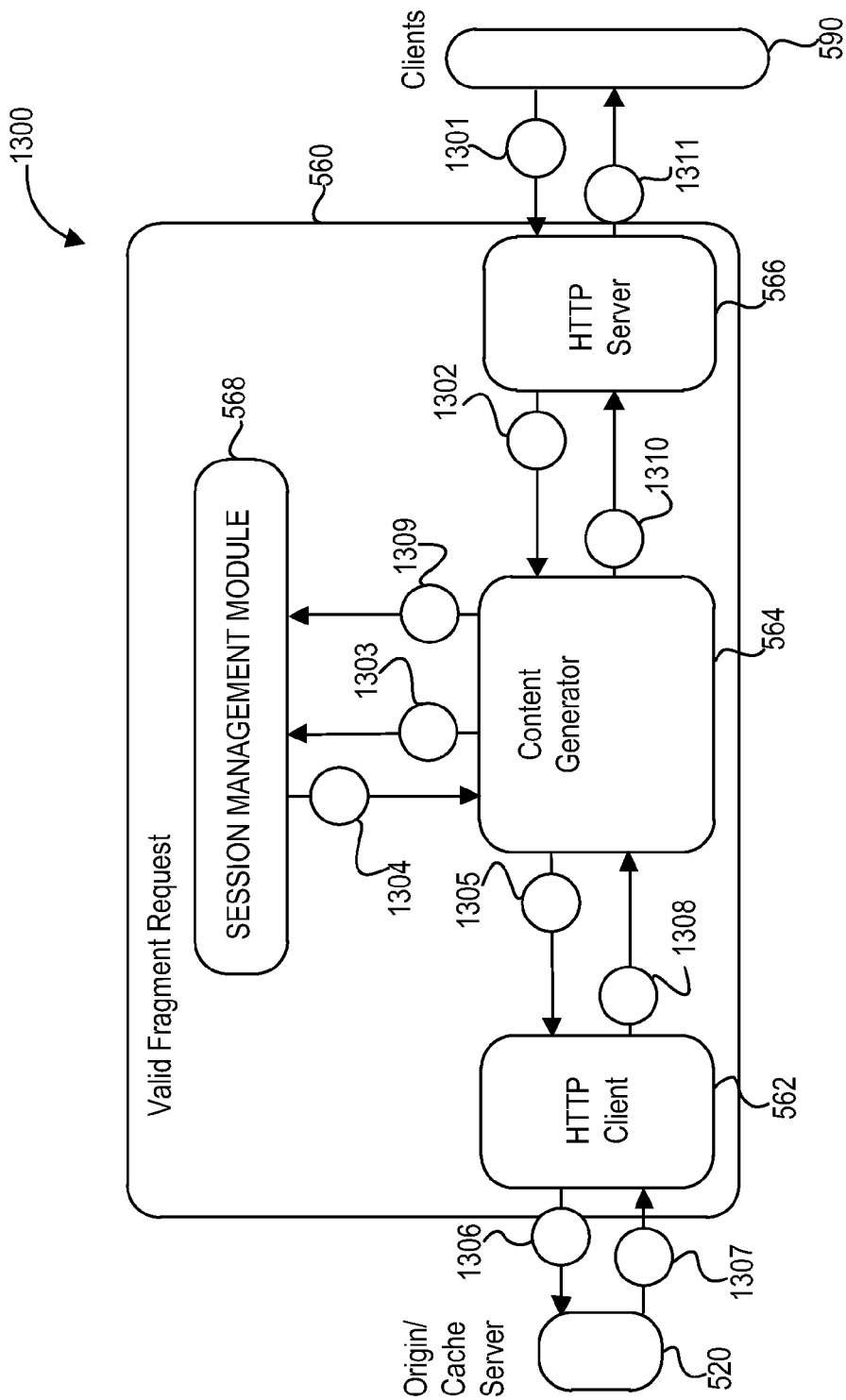
FIG. 13 illustrates an exemplary call flow for a valid fragment request.

Referring now to FIG. 13, there is illustrated an exemplary call flow 1300 for a valid fragment request.

Call flow 1300 begins at 1301, when HTTP server 566 receives an HTTP GET request for a content fragment from a client device 590.

At 1302, HTTP server 566 checks the validity of the request and, if the request is valid, forwards the request message to content generator 564 with the requested URL.

At 1303, content generator 564 determines that the request is for content fragment, extracts the unique session ID and notifies session management module 568 of the unique session identifier contained in the request.

Session management module 568 identifies the session and sends a message containing details of the session (e.g., policies, state, etc.) to content generator 564, at 1304.

At 1305, content generator 564 creates an appropriate request using the origin protocol and forwards the generated request to HTTP client 562.

At 1306, HTTP client 562 determines the appropriate IP address for origin server 520 and transmits a HTTP GET message with the generated request for the requested content fragment.

At 1307, origin server 520 responds with the requested content fragment.

HTTP client 562 transmits or forwards the requested content fragment to content generator 564, at 1308.

At 1309, content generator 564 (and the appropriate transmuxer) transmits information regarding the content fragment (e.g., number of bytes, etc.) to session management module 568. The transmitted information may include the unique session identifier (UUID) for the session, number of bytes sent for this fragment, duration of the content fragment sent, bitrate of the content fragment sent, and position in the content item (e.g., seconds from the start of the video that the current content fragment represents).

At 1310, content generator 564 (and the appropriate transmuxer) transmuxes the received content fragment from the origin protocol to the client protocol, and forwards the transmuxed content fragment to HTTP server 566.

Finally, at 1311, HTTP server 566 transmits the transmuxed content fragment to the client device 590.

Figure 14:
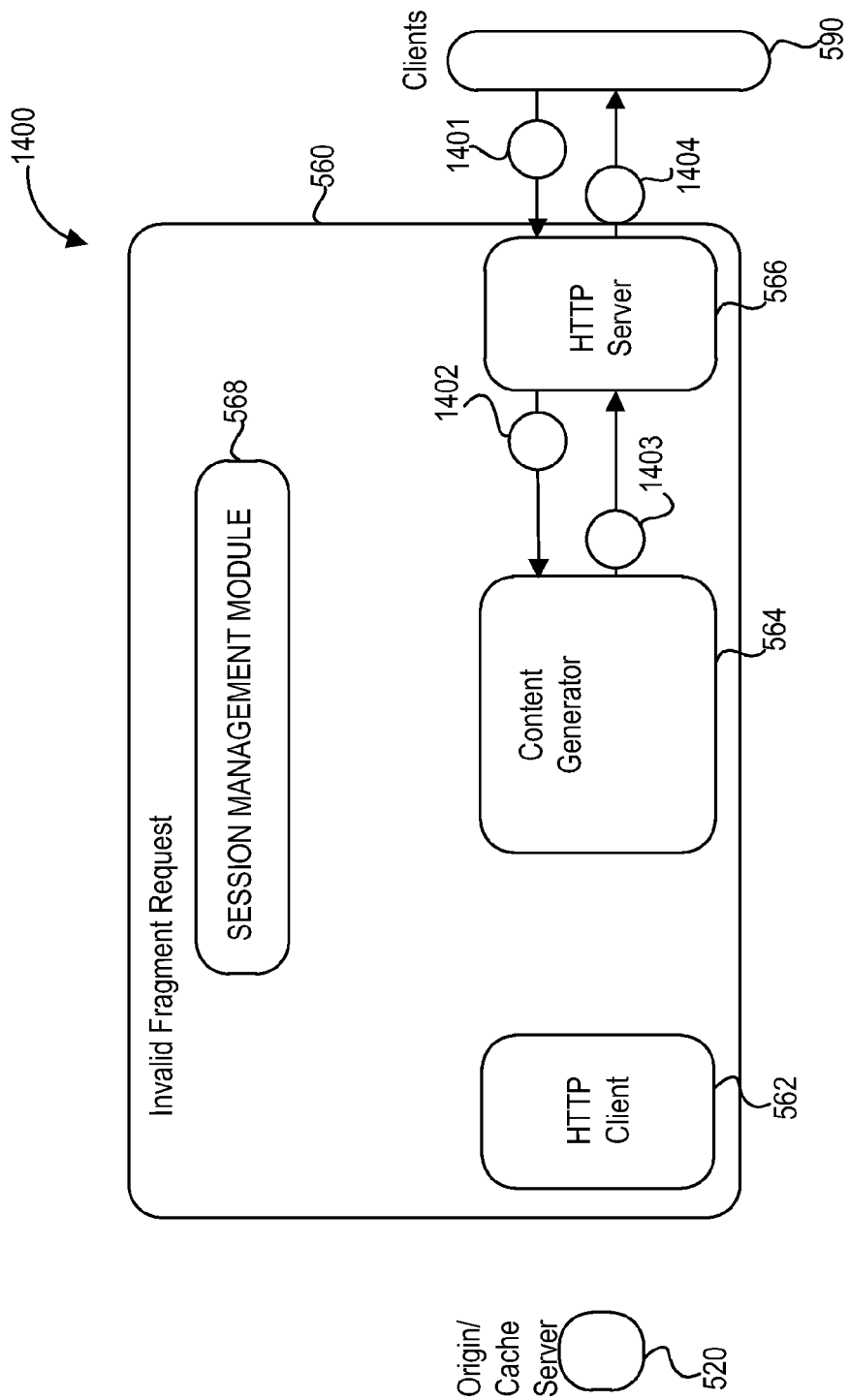
FIG. 14 illustrates an exemplary call flow for an invalid fragment request.

Referring now to FIG. 14, there is illustrated an exemplary call flow 1400 for an invalid fragment request.

Call flow 1400 begins at 1401, when HTTP server 566 receives an HTTP GET request for a content fragment from a client device 590.

At 1402, HTTP server 566 checks the validity of the request and, if the request is valid, forwards the request message to content generator 564 with the requested URL.

At 1403, content generator 564 determines that the request is an invalid fragment request and sends a rejection message to HTTP Server with an appropriate HTTP error code.

Finally, at 1404, HTTP server 566 transmits the rejection message to the client device 590.

Figure 15:
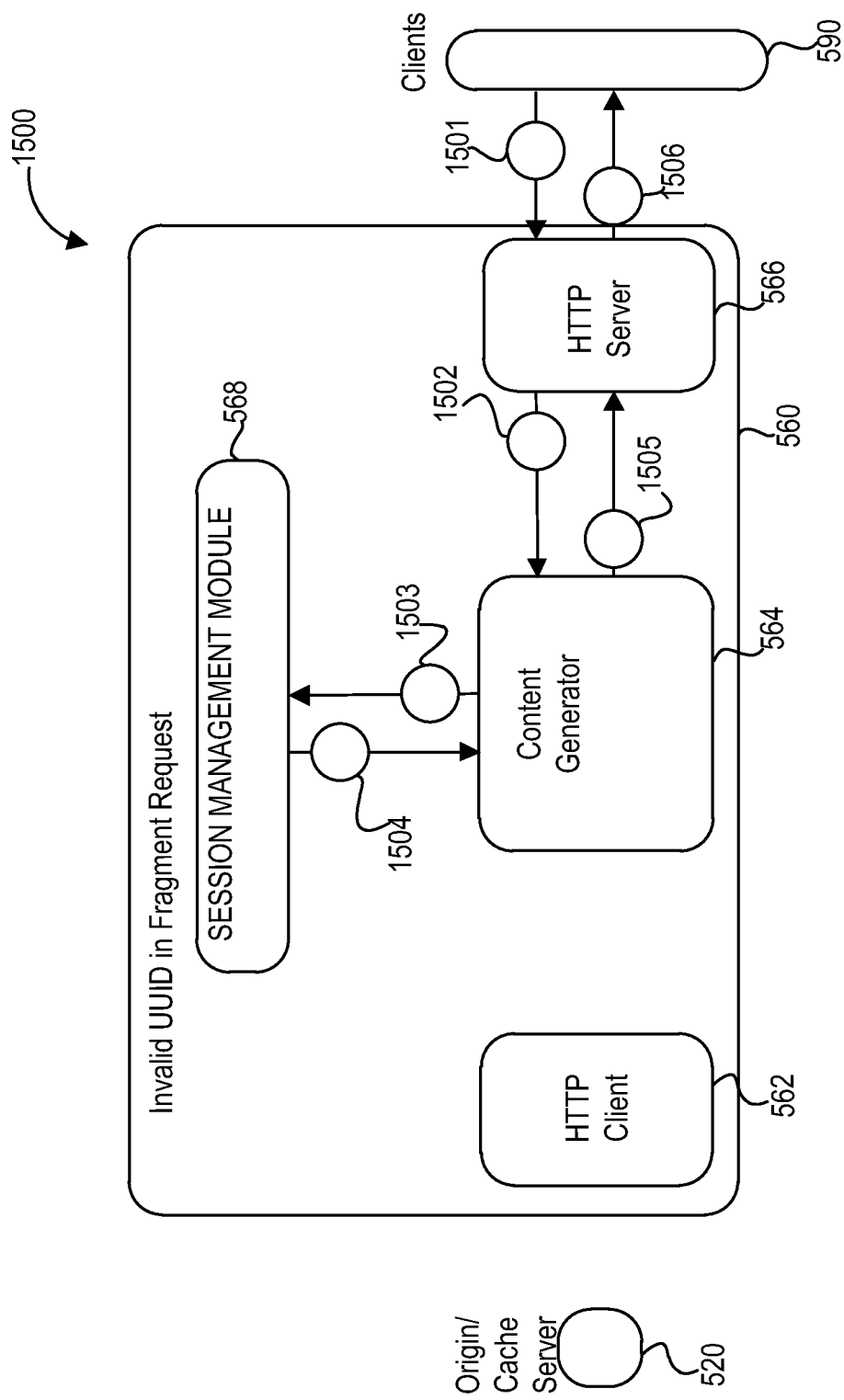
FIG. 15 illustrates an exemplary call flow for a content fragment request containing an invalid session identifier (UUID).

Referring now to FIG. 15, there is illustrated an exemplary call flow 1500 for a content fragment request containing an invalid session identifier (UUID).

Call flow 1500 begins at 1501, when HTTP server 566 receives an HTTP GET request for a content fragment from a client device 590.

At 1502, HTTP server 566 checks the validity of the request and, if the request is valid, forwards the request message to content generator 564 with the requested URL.

At 1503, content generator 564 determines that the request is for content fragment, and notifies session management module 568 of the unique session identifier contained in the request.

Session management module 568 attempts to identify a session corresponding to the unique identifier and, if it does not exist, sends an error message (e.g., session not found) to content generator 564, at 1504.

At 1505, content generator 564 creates an error message (e.g., HTTP error message) and forwards the message to HTTP server 566.

Finally, at 1506, HTTP server 566 transmits the error message to the client device 590.

As described herein, the reverse translating proxy approach allows the conversion of different adaptive streaming protocols on a "per request" and "on-the-fly" basis. Accordingly, the described approach has been optimized to transmux content on a per fragment request basis, while obviating the need to transmux additional content fragments until they are actually requested. Additional abilities include dynamically defining a response based on session context to optimize QoE. For example, if a policy has been set to limit bandwidth for a particular client, and the client requests a higher bitrate, the intermediate server can retrieve only those fragments that match the bandwidth policy.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A system for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising:
an intermediate server, communicatively coupled to the origin server and the client device, the intermediate server comprising at least one processor configured to provide:
a) a mapping module configured to receive a client request from the client device for at least a requested portion of the streaming media content item using a client delivery format, determine that the client request is in a client delivery format and generate an intermediate request in the origin delivery format that corresponds to the client request;
b) an intermediate client module configured to transmit the intermediate request to the server and receive a subset of the first plurality of content fragments corresponding to the requested portion of the streaming media content item, wherein the subset is received in the origin container format from the origin server using the origin delivery format;
c) a container conversion module configured to unpack the subset from the origin container format and pack the subset into a client container format, wherein the content fragments in the subset that are packed in the client container format remain encoded in the origin encoding format;
d) an intermediate server module configured to transmit the streaming media content item in the client container format to the client device using the client delivery format; and
(e) a session management module configured to initiate a streaming session when the client request is received, and further configured to determine a session state of the client device for the streaming session by monitoring fragment requests from the client device, and further configured to store, for each of a plurality of open client sessions, corresponding client session state information for associating the client request with one of the plurality of open client sessions.

2. The system of claim 1, wherein the container conversion module packs the streaming media content items into the client container format by reassembling the first plurality of content fragments into a second plurality of content fragments, wherein the second plurality of content fragments have different durations than the first plurality of content fragments.

3. The system of claim 1, wherein the mapping module determines that the origin server is configured to transmit using the origin delivery format by transmitting one or more requests using predetermined delivery formats and determining whether a successful response is received.

4. The system of claim 1, wherein the mapping module determines that the client request is in the client delivery format by comparing the client request with a plurality of predetermined request patterns.

5. A method for delivering a streaming media content item from an origin server to a client, wherein the origin server has an origin container format and an origin delivery format for the streaming media content, and wherein the streaming media content comprises a first plurality of content fragments encoded in an origin encoding format, the method comprising:
a) receiving a client request from the client for at least a requested portion of the streaming media content item using a client delivery format;
b) determining that the client request is in the client delivery format;
c) generating an intermediate request corresponding to the client request, wherein the origin request is in the origin delivery format;
d) transmitting the intermediate request to the server;
e) receiving a subset of the first plurality of content fragments corresponding to the requested portion of the streaming media content item, wherein the subset is received in the origin container format from the origin server using the origin delivery format;
f) a container conversion module unpacking the subset from the origin container format and packing the subset into a client container format, wherein the content fragments in the subset that are packed in the client container format remain encoded in the origin encoding format;
g) initiating a streaming session when the client request is received, determining a session state of the client for the streaming session by monitoring fragment requests from the client, and storing, for each of a plurality of open client sessions, corresponding client session state information for associating the client request with one of the plurality of open client sessions; and
h) transmitting the streaming media content item in the client container format to the client using the client delivery format.

6. The method of claim 5, wherein the packing is performed by reassembling the first plurality of content fragments into a second plurality of content fragments, wherein the second plurality of content fragments have different durations than the first plurality of content fragments.

7. The method of claim 5, further comprising determining that the origin server is configured to transmit using the origin delivery format by transmitting one or more requests using predetermined delivery formats and determining whether a successful response is received.

8. The method of claim 5, further comprising determining that the client request is in the client delivery format by comparing the client request with a plurality of predetermined request patterns.

9. A system for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising:
- a) a mapping module configured to receive at least one client request from the client device for at least a requested portion of the streaming media content item and generate an intermediate request that corresponds to the at least one client request;
- b) a session management module configured to initiate a streaming session when the at least one client request is received, the session management module further configured to determine a session state of the client device for the streaming session by monitoring the at least one client request, and further configured to store, for each of a plurality of open client sessions, corresponding client session state information for associating the at least one client request with one of the plurality of open client sessions;
- c) an intermediate client module configured to transmit the intermediate request to the server and receive a subset of the first plurality of content fragments corresponding to the requested portion of the streaming media content item;
- d) a container conversion module configured to unpack the subset from the origin container format and pack the subset into a client container format, wherein the content fragments in the subset that are packed in the client container format remain encoded in the origin encoding format;
- e) an intermediate server module configured to transmit the streaming media content item to the client device.

10. The system of claim 9, wherein the mapping module is configured to receive the client request using a client delivery format and determine that the client request is in the client delivery format, wherein the intermediate request is in the origin delivery format, wherein the subset of the first plurality of content fragments is received in the origin container format from the origin server using the origin delivery format, wherein the intermediate server module is configured to transmit the streaming media content item in the client container format to the client device using the client delivery format.

11. The system of claim 9, wherein the session management module is further configured to identify the state of all open client sessions.

12. The system of claim 9, wherein the session management module is further configured to mark the session state as inactive after a predetermined timeout period.

13. The system of claim 12, wherein the session management module is further configured to mark the session state as active when a further fragment request associated with the client session is received.

14. The system of claim 9, wherein the at least one client request comprises a plurality of client requests, and wherein the session state is determined based on a timing of the plurality of client requests.

15. The system of claim 14, wherein when the timing indicates that the plurality of client requests are for fragments that are out of sequence, then a seek operation is determined.

16. The system of claim 14, wherein when the timing indicates that an actual elapsed time exceeds a playing time of fragments requested in the plurality of client requests, then a trick play operation is determined.

17. A method for delivering a streaming media content item from an origin server to a client device, wherein the origin server has an origin container format and an origin delivery format for the streaming media content, and wherein the streaming media content comprises a first plurality of content fragments encoded in an origin encoding format, the system comprising:
- a) receiving at least one client request from the client device for at least a requested portion of the streaming media content item;
- b) generating an intermediate request that corresponds to the at least one client request;
- c) initiating a streaming session when the at least one client request is received;
- d) determining a session state of the client device for the streaming session by monitoring the at least one client request;
- e) transmitting the intermediate request to the server;
- f) receiving a subset of the first plurality of content fragments corresponding to the requested portion of the streaming media content item;
- g) a container conversion module unpacking the subset from the origin container format and packing the subset into a client container format, wherein the content fragments in the subset that are packed in the client container format remain encoded in the origin encoding format;
- h) initiating a streaming session when the client request is received, determining a session state of the client device for the streaming session by monitoring fragment requests from the client, and storing, for each of a plurality of open client sessions, corresponding client session state information for associating the client request with one of the plurality of open client sessions; and
- i) transmitting the streaming media content item to the client device.

18. The method of claim 17, wherein the client request is received using a client delivery format, wherein the intermediate request is in the origin delivery format, wherein the subset of the first plurality of content fragments is received in the origin container format from the origin server using the origin delivery format, and wherein the streaming media content item is transmitted in the client container format to the client device using the client delivery format.

19. The method of claim 17, further comprising identifying the state of all open client sessions.

20. The method of claim 17, further comprising marking the session state as inactive after a predetermined timeout period.

21. The method of claim 20, further comprising marking the session state as active when a further fragment request associated with the client session is received.

22. The method of claim 17, wherein the at least one client request comprises a plurality of client requests, and wherein the session state is determined based on a timing of the plurality of client requests.

23. The method of claim 22, wherein when the timing indicates that the plurality of client requests are for fragments that are out of sequence, then a seek operation is determined.

24. The method of claim 22, wherein when the timing indicates that an actual elapsed time exceeds a playing time of fragments requested in the plurality of client requests, then a trick play operation is determined.

* * * * *